US011941947B2

(12) United States Patent
Davis

(10) Patent No.: US 11,941,947 B2
(45) Date of Patent: Mar. 26, 2024

(54) PROGRESSIVE GAME WITH MEMORY STATES IN ALIGNED PLAY POSITIONS FOR BENEFIT IN SUBSEQUENT PLAYS THEREOF

(71) Applicant: Epic Tech, LLC, Suwanee, GA (US)

(72) Inventor: Steven Wesley Davis, Suwanee, GA (US)

(73) Assignee: Epic Tech, LLC

( * ) Notice: Subject to any disclaimer, the term of this patent is extended or adjusted under 35 U.S.C. 154(b) by 0 days.

(21) Appl. No.: 17/671,991

(22) Filed: Feb. 15, 2022

(65) Prior Publication Data

US 2022/0351579 A1 Nov. 3, 2022

Related U.S. Application Data

(60) Provisional application No. 63/181,957, filed on Apr. 29, 2021.

(51) Int. Cl.
*G07F 17/32* (2006.01)

(52) U.S. Cl.
CPC ...... *G07F 17/3267* (2013.01); *G07F 17/3213* (2013.01); *G07F 17/3258* (2013.01)

(58) Field of Classification Search
None
See application file for complete search history.

(56) References Cited

U.S. PATENT DOCUMENTS 10,902,702 B1 * 1/2021 Sanborn .............. G07F 17/3267
2009/0069071 A1 * 3/2009 Aoki ......................... A63F 9/24 463/20
2015/0339881 A1 * 11/2015 Falciglia, Sr. .......... G07F 17/34 463/20
2016/0055705 A1 * 2/2016 Elias ....................... G07F 17/34 463/20
2016/0351005 A1 * 12/2016 Igesund .................. G07F 17/34
2016/0364944 A1 * 12/2016 Elias ....................... G07F 17/34
2019/0080552 A1 * 3/2019 Oyama ................. G07F 17/326
2019/0378375 A1 * 12/2019 Bolling, Jr. ......... G07F 17/3251
2020/0027310 A1 * 1/2020 Davis .................. G07F 17/3288
2020/0402348 A1 * 12/2020 Karrbrink ........... G07F 17/3213

* cited by examiner

*Primary Examiner* — Jason T Yen
(74) *Attorney, Agent, or Firm* — Baker Donelson; Carl M. Davis, II

(57) ABSTRACT

A column and row matrix of play positions each having an open state and locked state, the open state for display of a random game symbol received during play of a game and the locked state for holding a game symbol having an award, for creating a win row or win column of award game symbols during sequential plays of the game, which game symbols in the win row after award are removed and award game symbols vertically higher in the matrix cascade to a lower play position having an open state for re-arranging the matrix for subsequent play of the game. A method of re-arranging a matrix game for play is disclosed.

22 Claims, 21 Drawing Sheets

PROGRESSIVE GAME WITH MEMORY STATES IN ALIGNED PLAY POSITIONS FOR BENEFIT IN SUBSEQUENT PLAYS THEREOF

TECHNICAL FIELD

The present invention relates to apparatus and methods for entertaining play of games. More particularly, the present invention relates to apparatus and methods for a progressive game that applies memory states of game plays in aligned play positions and possible re-arrangement for winning benefit in subsequent plays of the game to provide an entertaining engagement for players.

BACKGROUND OF THE INVENTION

Games provide players with amusing yet often intellectually challenging diversionary leisure activities, including for individual and group play events. Such games include board games, card games, and electronic games. Some games provide random occurrence of a plurality of game play elements during play of a game, which may result in an award of a prize to the player if the plurality of game play elements match a predetermined game win criteria.

Electronic games typically have a player-actuated input control device or button. The player presses the button to selectively operate action of the game. For example, the player registers with the electronic game such as providing a game play token or fee, and subsequently, plays one or more games upon actuation of the play button. Some games include a skill feature that is operative during play. Skill-based electronic redemption games typically require some level of skill to accomplish a task in order to win a game, a task, or game element, an achieve a win value, a prize, improved play opportunity, or score, which may be rewarded with points, credits, other such designation, or advantages in play of the game leading to a win. Random draw games provide a player with an excitement of learning outcomes for possible wins upon play of the game. There is an interest by the player in finding out the results of activation of aa game by pressing the player input button. Past plays do not however lead to a benefit during a subsequent play. And such repetitive activation particularly in a random draw game may develop a complacency towards playing a particular game. Rather, game providers seek provide entertaining graphics and music to retain interest and playing participation by players in the games playing community. Skill-based tasks that exercise a player's experience with a game and with accomplishing successfully its particular task, leads to increased player satisfaction through increased observational and determinative skills for improving play to achieve a resulting action. Game actions accordingly enhance player attention during play and develop increased satisfaction with game outcomes, which maintains player interest in play of a game.

In view thereof, there is a need in the art for interesting and dynamic game actions for random draw games to achieve enhanced player attention, interest, and satisfaction from playing such games and applying from prior plays accomplishments that may afford a benefit in a subsequent entertaining play of the game by the player. It is to such that the present invention is directed.

BRIEF SUMMARY OF THE PRESENT INVENTION

The present invention meets the need in art by providing a sequential play game having a re-arrangeable play matrix of a plurality of columns and rows of play positions, whereby each column has a respective vertical stack of play positions and laterally adjacent play positions in each vertical stack define the respective row of play positions, said play positions displaying game symbols during play of the game. Each play position has either an open state or a locked state, said open state for receiving one of a plurality of game symbols for display during a play of the game, each said game symbol being of a first type or of a second type, and said locked state holding the game symbol of the first type. During play of the game, the play positions having the open state display one of the plurality of the game symbols received during a predetermined period. Upon completion of the predetermined period, each play position having the open state and displaying the game symbol of the first type changes from the open state to the locked state. A game controller, upon occurrence of a win event in which one or more of the rows is a win row by displaying the game symbol of the first type matching a predetermined win criteria or one or more of the columns is a win column by displaying the game symbol of the first type matching the predetermined win criteria, is configured to: award a prize value associated with each game symbol of the first type in said win row or win column, change the respective state of each play position in said win row or said win column having the locked state to the open state, remove the display of each game symbol of the first type in said win row or said win column, and if a win row, cascade the game symbol of the first type in a play position vertically higher in the stack than the win row, if any, to a sequentially lowermost play position in the stack having the open state, change the sequentially lowermost play position to the locked state, and change the play position from which the game symbol of the first type cascaded to the open state; and play the game and make the win determination, and if there is a win row or a win column, award a prize value associated with each game symbol of the first type in said win row or win column. The game may be played again, with the resulting matrix.

In another aspect, the present invention provides a method of arranging a matrix in a sequential play game, comprising the steps of:

displaying a play matrix of a plurality of columns and rows of play positions, whereby each column has respective vertical stack of play positions and laterally adjacent play positions in each vertical stack define the respective row of play positions, each play position having an open state or a locked state;

providing a plurality of game symbols for random display in the play positions of the matrix, the game symbols of a first type for an award and of a second type, the game symbols displayed in the play positions having the open state;

after stopping the providing of the game symbols, for each play position having the open state and displaying the game symbol of the first type, changing said play position from the open state to the locked state;

upon occurrence of a win event of one of the rows displaying the game symbol of the first type as a win row matching a predetermined win criteria or of one of the columns displaying the game symbol of the first type as a win column matching the predetermined win criteria:

awarding a prize value associated with each game symbol of the first type in said win row or said win column;

changing the respective state of each play position in said win row or said win column having the locked state to the open state;

removing the display of each game symbol of the first type in said win row or said win column;

if a win row win, cascading the game symbol of the first type in a play position in the respective column vertically higher than the win row, if any, to a sequentially lowermost play position having the open state, changing said sequentially lowermost play position to the locked state and the play position from which the game symbol of the first type cascaded to the open state; and playing the game and making-the win event determination, and if there is a win row or a win column, awarding a prize value associated with each game symbol of the first type in said win row or win column; and determining whether to play the game again with the matrix.

Objects, advantages and features of the present invention will be readily ascertained upon a reading of the following detailed description of illustrative embodiments in conjunction with the drawings.

DETAILED DESCRIPTION

Figure 1:
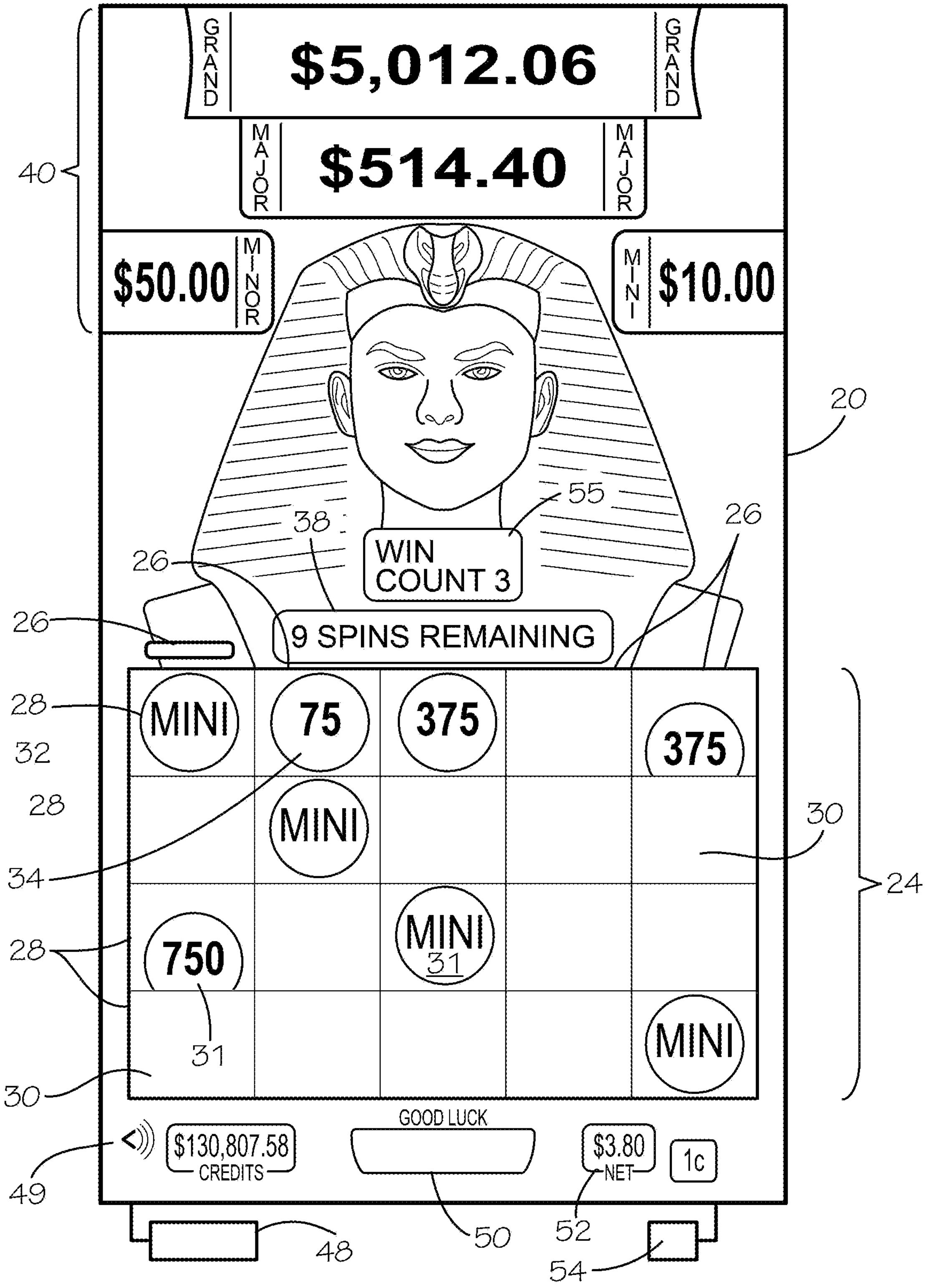
FIG. 1 illustrates a game machine having a display for displaying play actions of a progressive reel-type game with memory states in aligned play positions for entertaining play by players in accordance with the present invention.

With reference to the drawings in which like parts have like reference numerals, FIG. 1 illustrates an electronic display screen 20 for display of a play of an electronic game, in the illustrated embodiment a reel-type game, configured for progressive play that applies memory states of game plays in aligned play positions, and possible re-arrangement of the game play positions, for entertaining play of the game in accordance with the present invention. The term "progressive" refers to the game, once commenced with a first play, may be operated for subsequent successive plays while the memory states of the play positions achieved in prior plays may benefit for a winning outcome of the subsequent one or more plays, whereby the initial and subsequent game plays provides a progression of entertaining and stimulating action for the interest of the player.

The illustrated electronic game comprises one or more simulated rotatable reels 22 and portions of which are for display in a matrix format generally 24 of columns 26 and rows 28 to define a plurality of play positions 30. Each reel 22 has a plurality of sequential positions and each position depicts a game symbol of a first type 31 or of a second type 33. The first type 31 of game symbol includes an associated award value that may be won by the player during play of the game. The second type 33 of game symbol lacks a win award but may be displayed in the game matrix 24 during play actions of the game. In the illustrated embodiment, the game symbol of the first type 31 includes as an award value a prize award 32 such as for example expressed in monetary units or as a name of a prize that can be won, a points value 34 such as for example expressed in credits or tokens that may be accumulated and exchanged for merchandise by the winning player, or a spin value 36 (see FIG. 3D) such as a numerical value that adds to a play counter 38 showing a number of progressive games remaining to be played by the player. The spin value 36 may be a discrete symbol or may in an alternate embodiment be displayed on an obverse side of the displayed award value game symbol. In the illustrated embodiment, the game symbol of the first type 31 are illustrated as a gold coin.

The illustrated embodiment displays the game play matrix 24 of five (5) columns and four (4) rows with twenty (20) play positions 30. Any number of columns or rows may be utilized. Each column 26 has a respective vertical stack of play positions 30 one over another. Laterally adjacent play positions 30 in adjacent columns 26 define the respective rows 28 of the play positions. Each column 26 is associated with a respective one of the reels 22. Each play position 30 includes a memory state that is either an open state or a locked state. A play position 30 having an open state may display one of the sequential symbol positions of the reel 22 during rotation of the reel during a play of the game. A play position 30 having a locked state has received and holds one of the game symbols of the first type at the conclusion of the rotation of the reel during a play of the game. The play position 30 having a game symbol of the first type changes its memory state from open to locked, for subsequent display and use in determining a possible wining outcome for the player in a subsequent play of the game. An initial commencement of the game provides the game matrix 24 with unfilled play positions 30 and each has an open state. In the exemplary illustration of FIG. 1, game plays have previously occurred, and various of the play positions have locked states with first type game symbols including the prize award 32 the points value 34, and the spin value 36 (see FIG. 3D, for example). The other of the play positions 30 are open state.

The electronic display screen 20 may further display generally 40 one or more prizes that may be won during play, for example, a mini prize 42*a*, a minor prize 42*b*, a major prize 42*c*, and grand prize 42*d*, each of which may be randomly awarded based conventionally on player participation entry fee and expected plays while accommodating game administration costs and prizes. The illustrated embodiment provides for a player to win one or more of the prizes 40, which may have differing prize amounts. The amounts in the illustrated embodiment increase from the mini prize 42*a* of a first initial amount, the minor prize 42*b* of a second initial amount greater than the first initial amount, the major prize 42*c* of a third initial amount greater than the second initial amount, and the grand prize 42 of a fourth initial amount greater than the third initial amount. The game may include actions that result in increasing a respective one of the prizes 40. The prize award 32 may, as shown in the illustrated embodiment, display the name of one of the prizes that may be won by a player. A game controller includes a microprocessor 48 configured with software instructions for the game play actions as well as providing operation of the display 20 and game play input devices such as a player input button 46. The game conventionally includes a sound control button 49, a player win accumulator 50, player participation entry fee indicator 52, and the player input button 54 for instructing game activity (e.g., start game play, continue game play, and select a play option). The sound control button 49 accesses adjustors for sound level such as for music and entertainment sounds of the game during play. The player participation entry fee 52 may be selectively set by the player with adjustors (such as a "−" for reduction and "+" for increase).

FIG. 1 further illustrates for an alternate embodiment a win count 55, which displays the number of wins a player has achieved during sequential plays of the game after initiation of a first request to play.

Figure 2A:
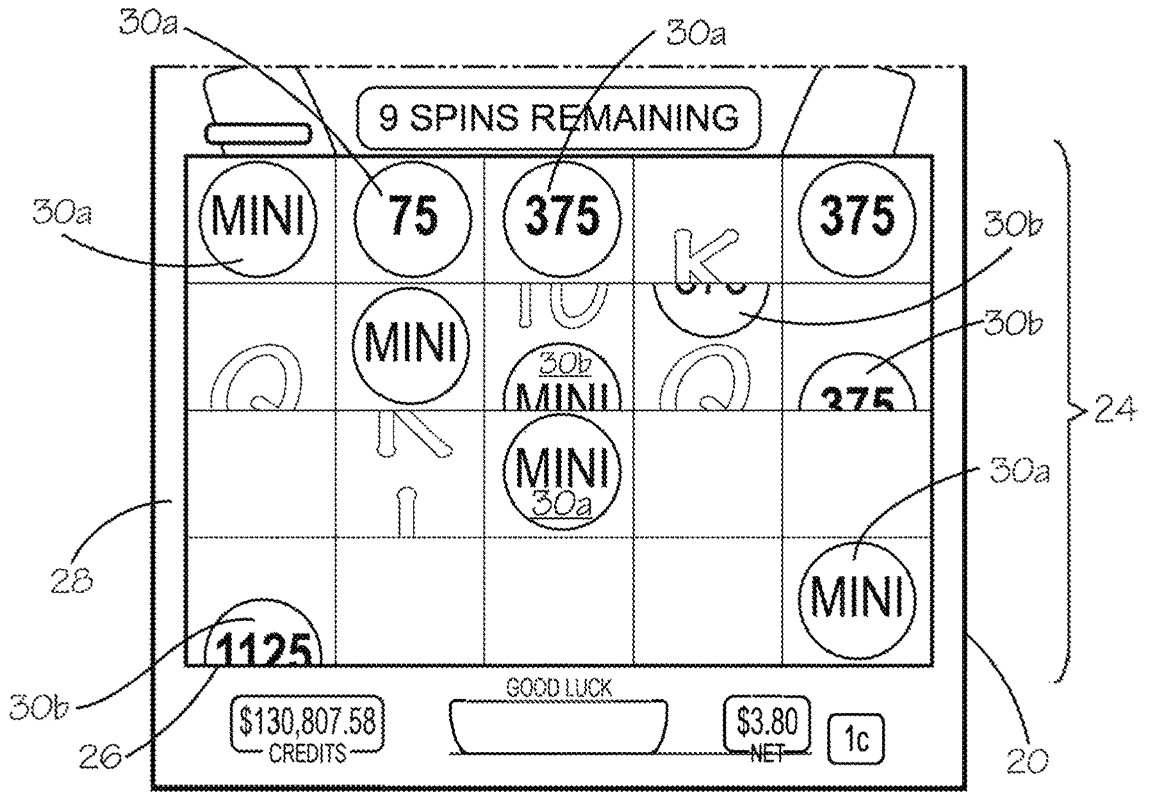
FIGS. 2A-2E illustrate a detailed portion of the display showing an exemplary play of a progressive reel-type game with memory states in aligned play positions during a simulated rotation of the reels in a play of the game machine illustrated in FIG. 1.
Figure 2B:
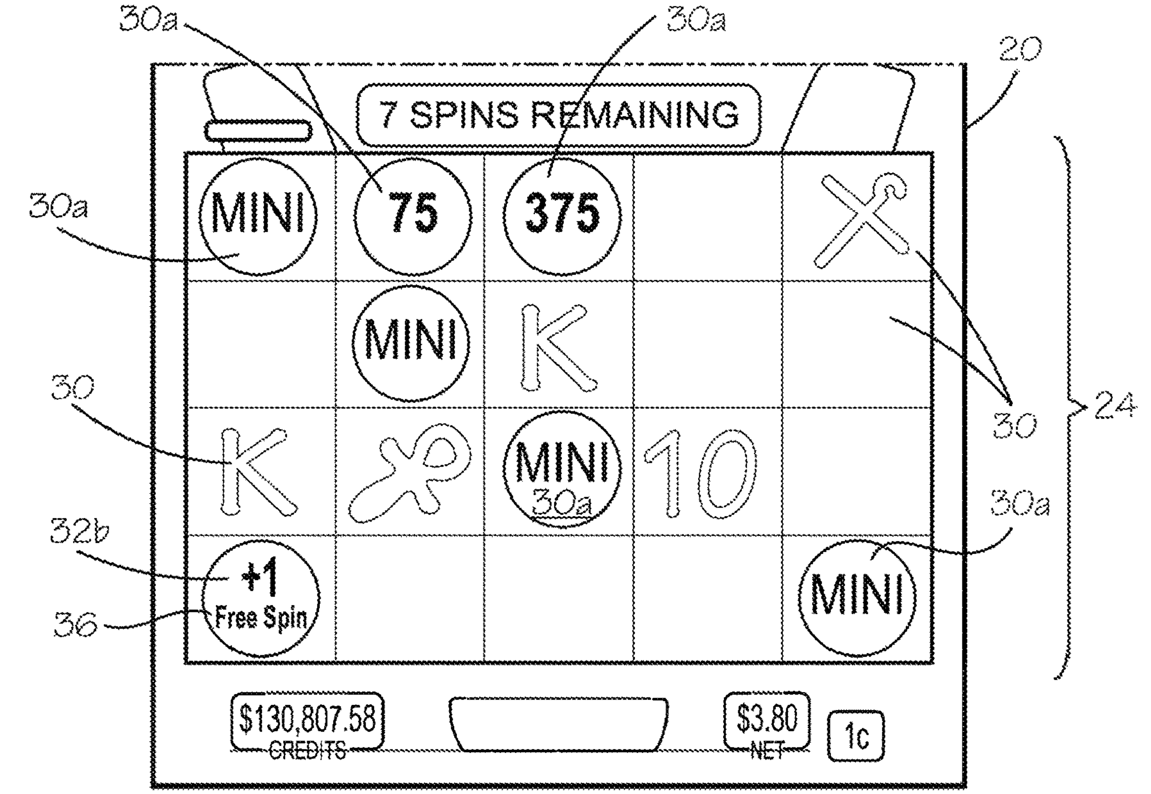
Figure 2C:
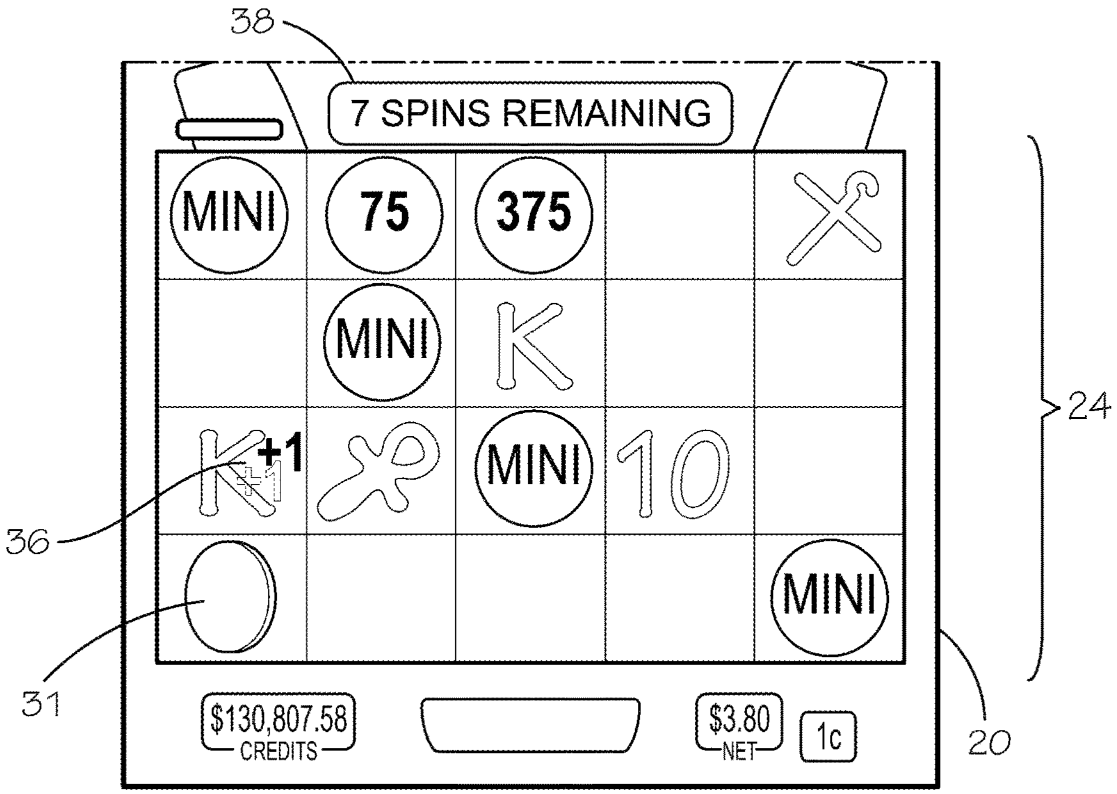
Figure 2D:
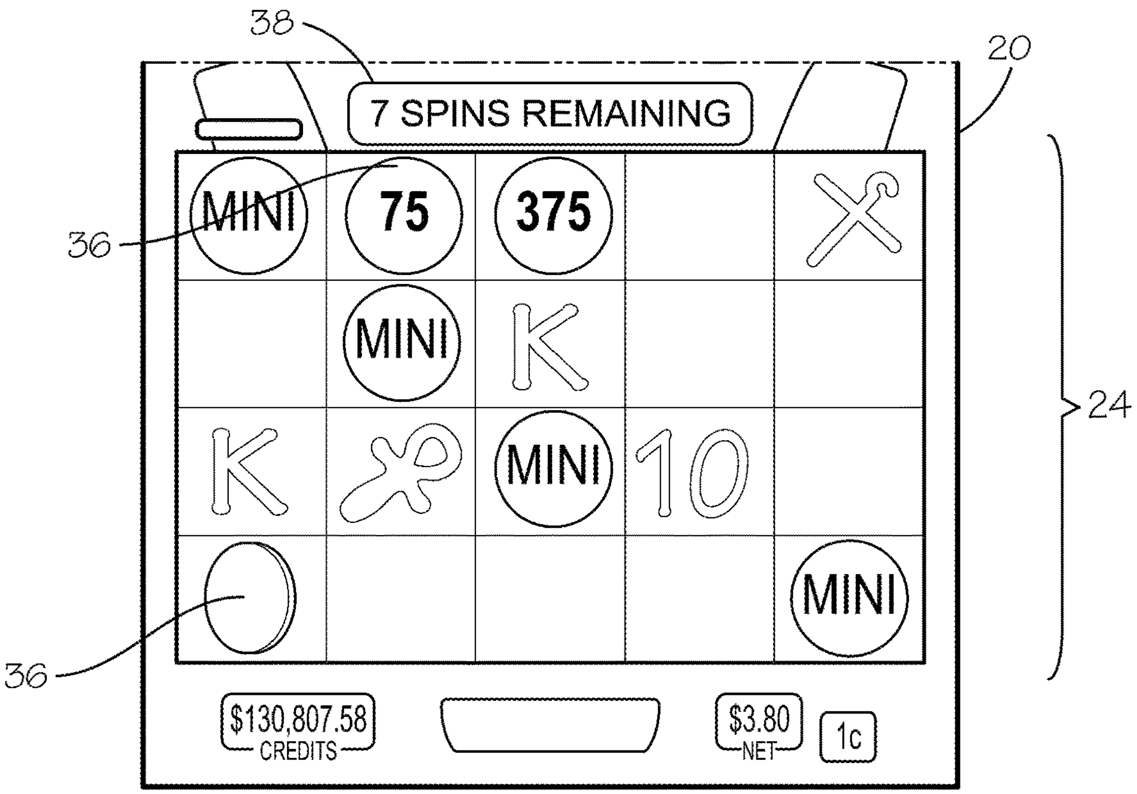
Figure 2E:
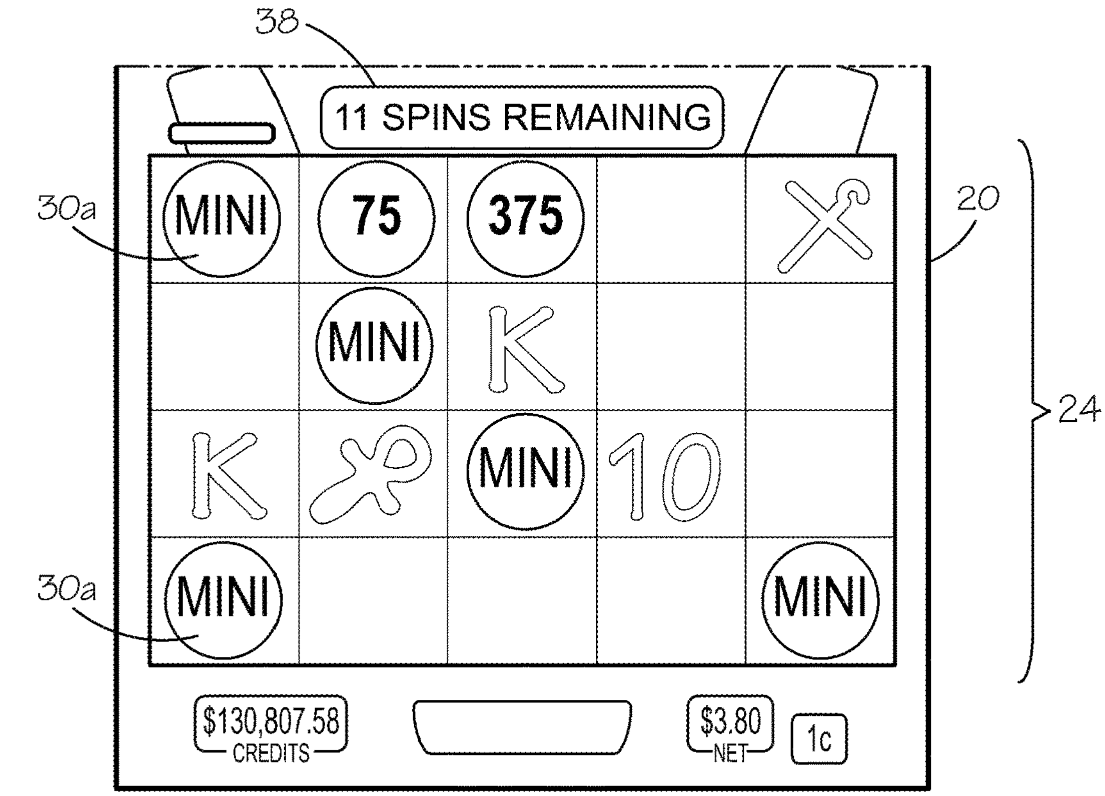

FIGS. 2A-2E illustrate a detailed portion of the display 20 showing an exemplary play of the progressive reel-type game with memory states in aligned play positions 30 during a simulated rotation of the reels 22 in a play of the game machine illustrated in FIG. 1. As illustrated in FIG. 2A, the play positions 30*a* having the locked state remain displayed. The play positions 30*b* having the open state receive and display the sequence of the game symbols associated with the respective reel 22 (as shown with the game symbol partially entering or exiting a respective play position 30). FIG. 2B illustrates the matrix 24 in an illustrative conclusion of a rotation of the reels. The prior play positions 30*a* remain and an additional prize award 32 remains in one of the play positions 30*b* having the open state. The game changes the respective play position to the locked state. In the illustrated embodiment, the prize award 32 is one of the spin value 36. The game dynamically and entertainingly transfers the amount of the spin value to the play counter 38, as shown in FIGS. 2C and 2D with the amount of the spin value 38 moving across the matrix 24. The amount of the spin value 38 then increments the play counter as shown in FIG. 2E. However, as may be provided in an alternate embodiment, the obverse of the prize award may include another prize award. As shown in FIG. 2D, the displayed game symbol rotates to display the obverse, which in the illustrated embodiment as shown in FIG. 2E displays the name of the prize award 32 as "mini" corresponding to the prize 42*b* shown on the display 20. The game may then be progressively played as the player has remaining spins shown in the counter 38 and the matrix 24 has an additional prize award 30*a* displayed in a game position 30 with a locked state.

Figure 3A:
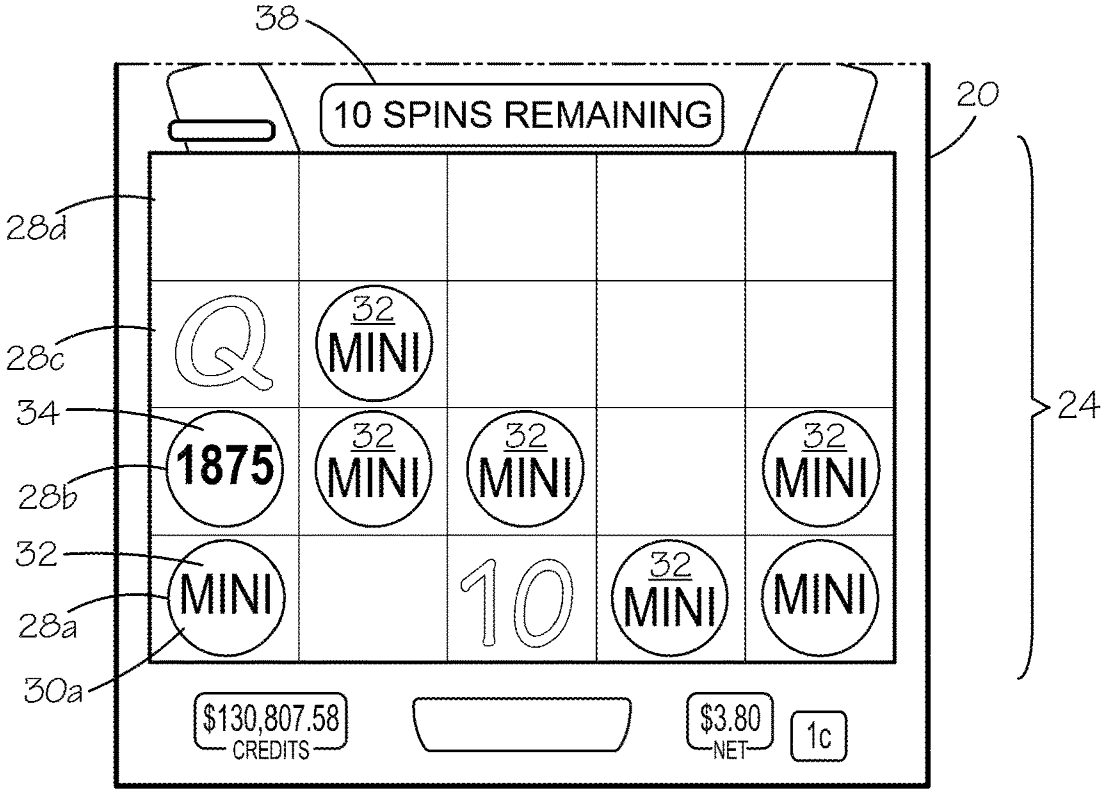
FIGS. 3A-3M illustrate a detailed portion of the display showing an exemplary winning outcome of a simulated rotation of the reels during play of a progressive reel-type game with memory states in aligned play positions and resulting game actions during a play of the game machine illustrated in FIG. 1.
Figure 3B:
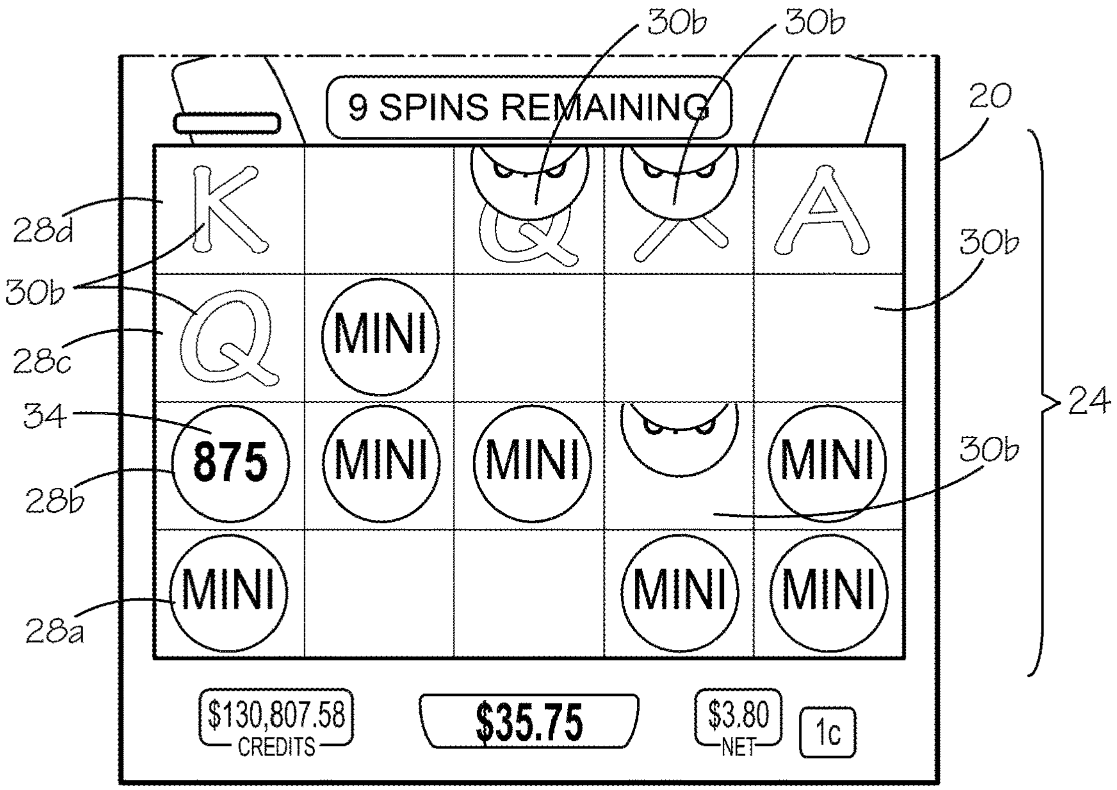
Figure 3C:
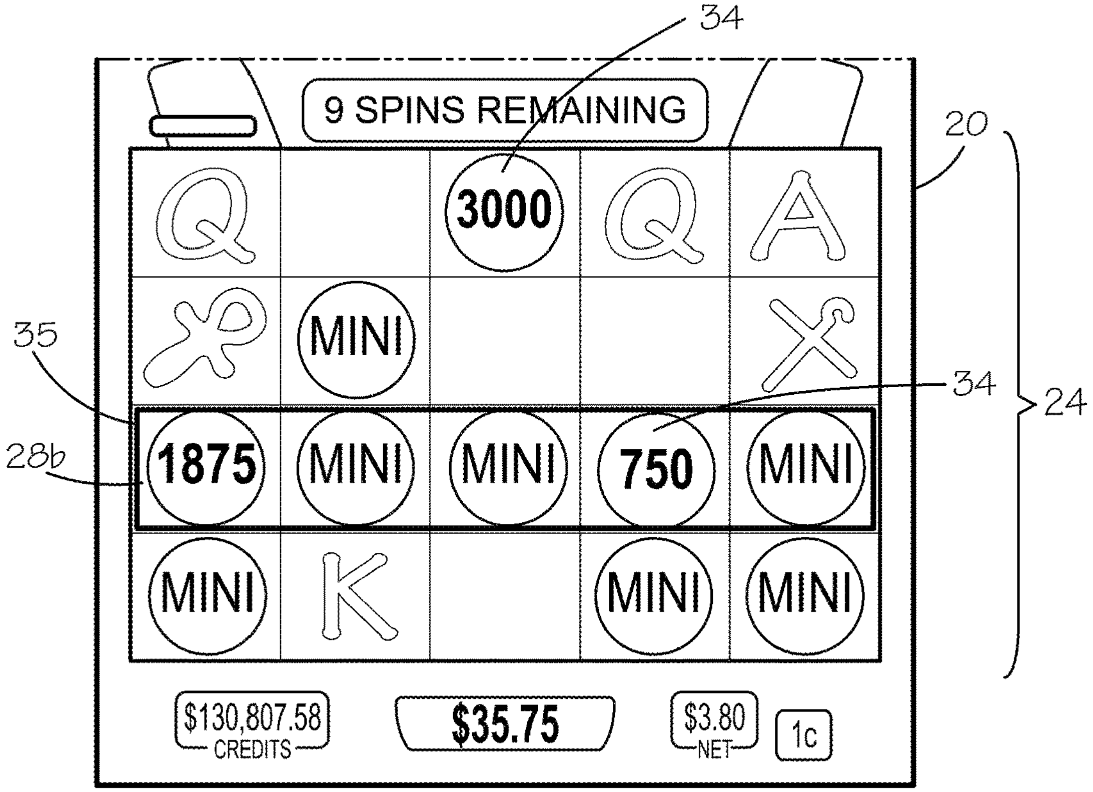
Figure 3D:
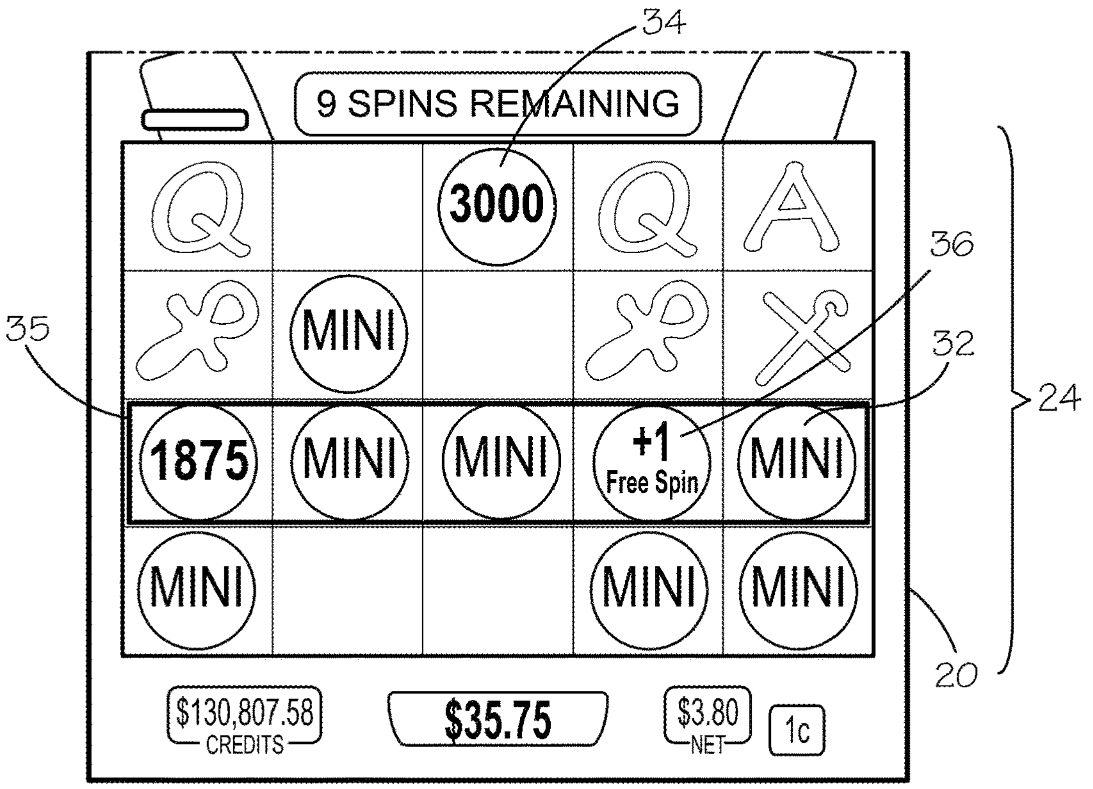

FIGS. 3A-3M illustrate a detailed portion of the display 20 showing a sequence in an exemplary winning outcome of a simulated rotation of the reels during play of a progressive reel-type game with memory states in aligned play positions and resulting game actions that re-adjust the matrix 24 during a play of the game machine illustrated in FIG. 1. FIG. 3A illustrates the result of a preceding play of the game upon the reels 22 stopping. The matrix 24 displays the four rows 28*a*, 28*b*, 28*c*, and 28*d*. Rows 28*a* and 28*b* are partially complete with three play positions 30*a* displaying prize awards 32 in row 28*a* and four play positions 30*a* displaying prize awards 32 in row 28*b*. These play positions have lock states. Row 28*c* displays one prize award 32 which likewise holds a lock state. The remaining play positions 30 are open state for displaying game symbols of the reels during the subsequent play of the game. FIG. 3B illustrates a portion of the rotation of the reels 22 and display of a game symbol in some of the available open state play positions 30*b*. FIG. 3C illustrates the end of the rotation, with the open position in row 28*b* now filled with a points value 34. Row 28*d* has received and holds a points value 34 as well. The game changes the state of these two respective play positions from open to locked. As shown in FIG. 3D, the obverse of the points value 34 in row 28*b* displays a spin value 36 affording the player an additional free spin.

Figure 3E:
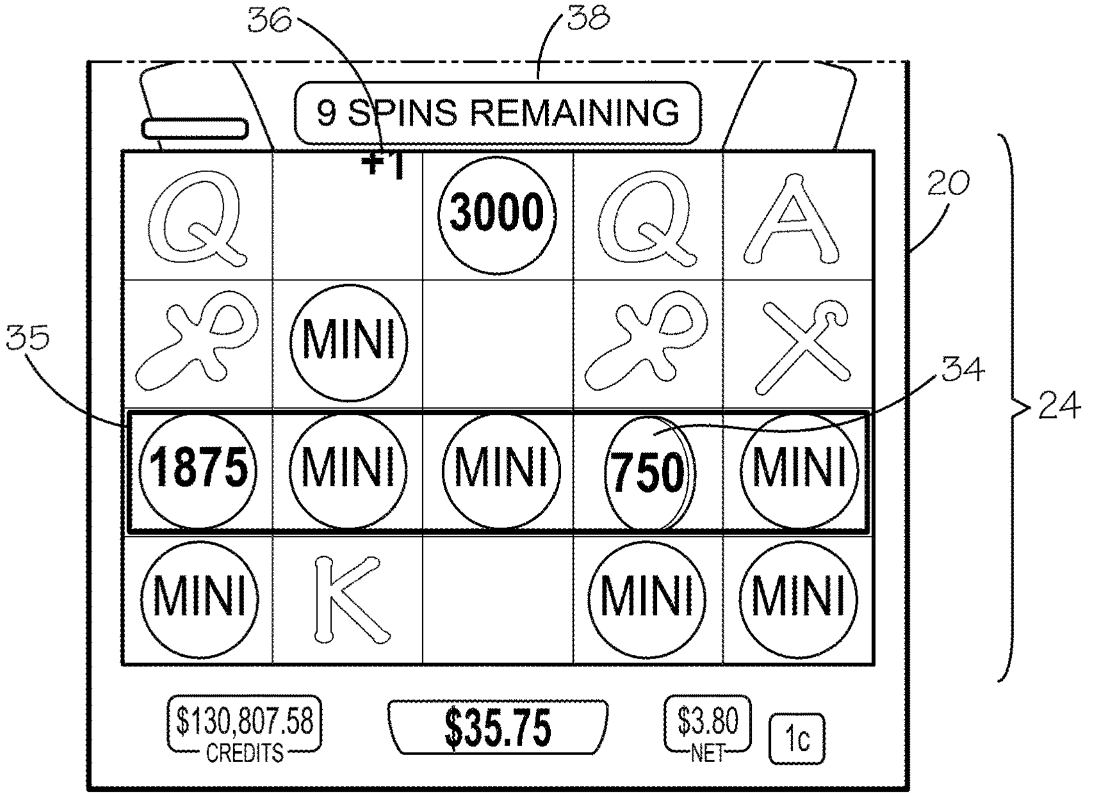
Figure 3F:
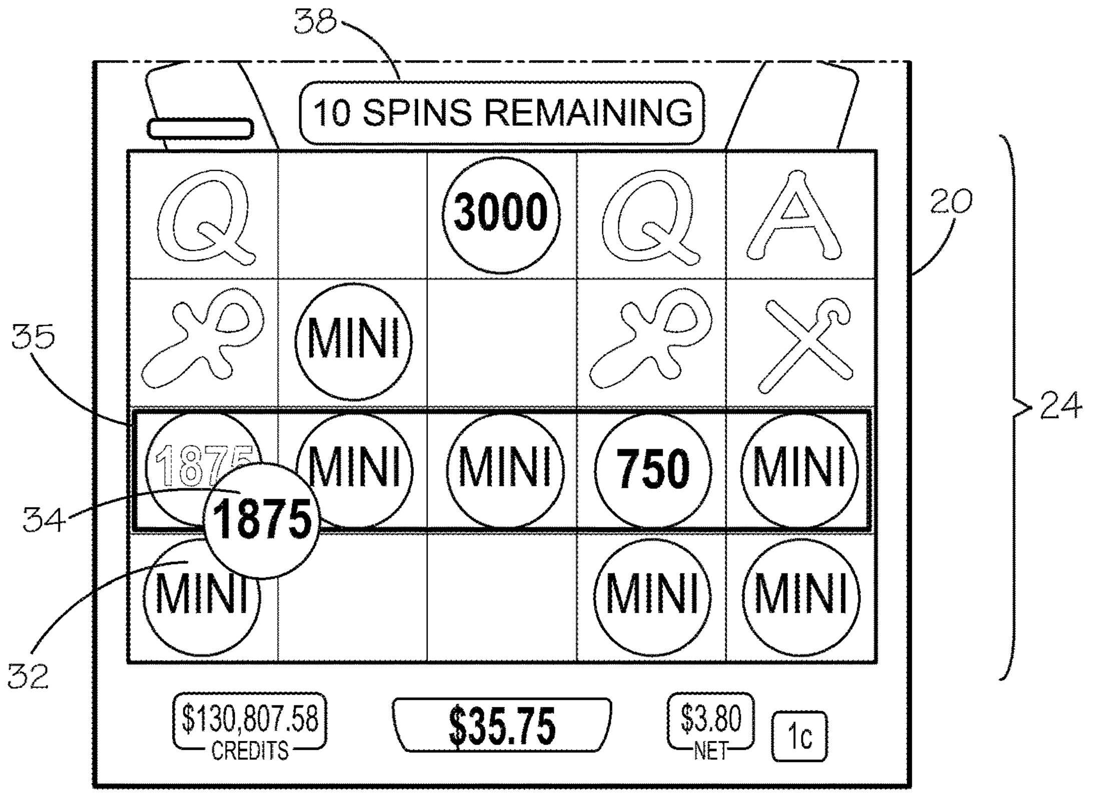

The amount of the spin value 36 transfers movingly across the matrix 24 (as discussed above) for entertaining attention for the player in increasing the player's play opportunities as shown in FIGS. 3D, 3E, and 3F. As shown in FIG. 3E, the display of the spin value flips back to display the points value 34 while the amount of the spin value 34 moves to the spin remaining accumulator 38. The spins remaining accumulator 38 increments with the amount of the won spin value displayed at the end of the rotation as shown in FIG. 3D.

Figure 3G:
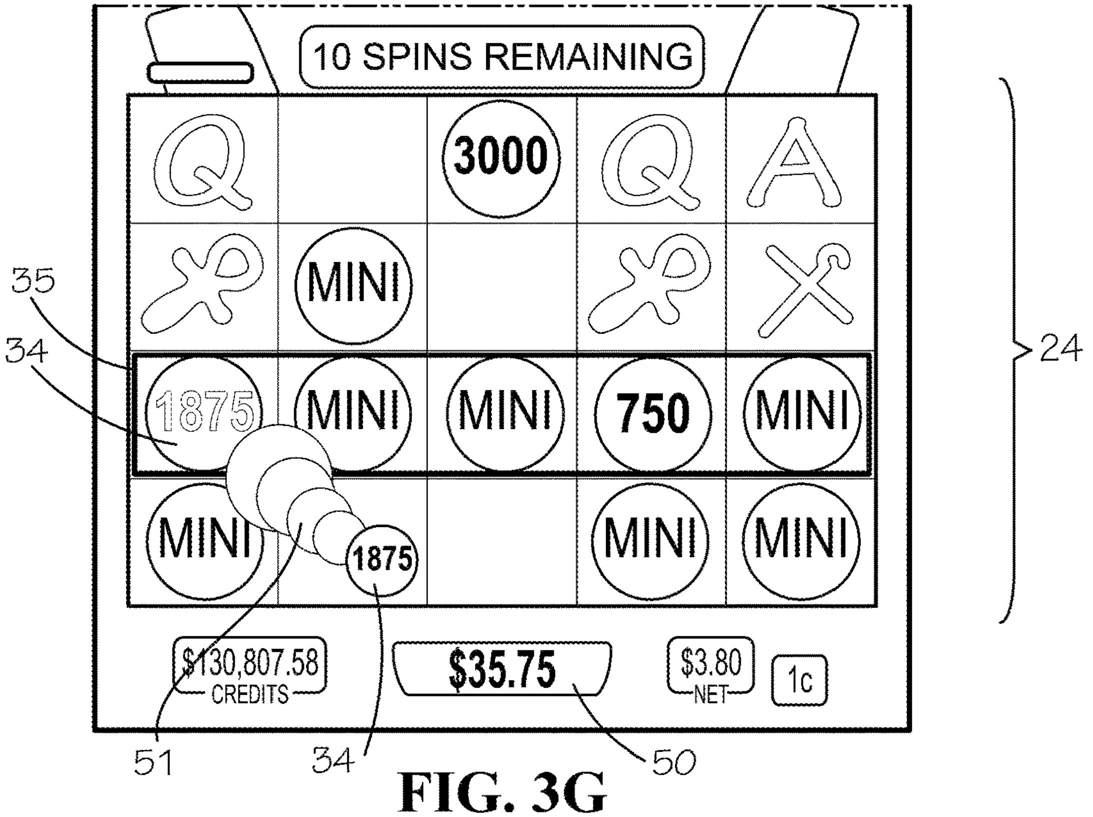
Figure 3H:
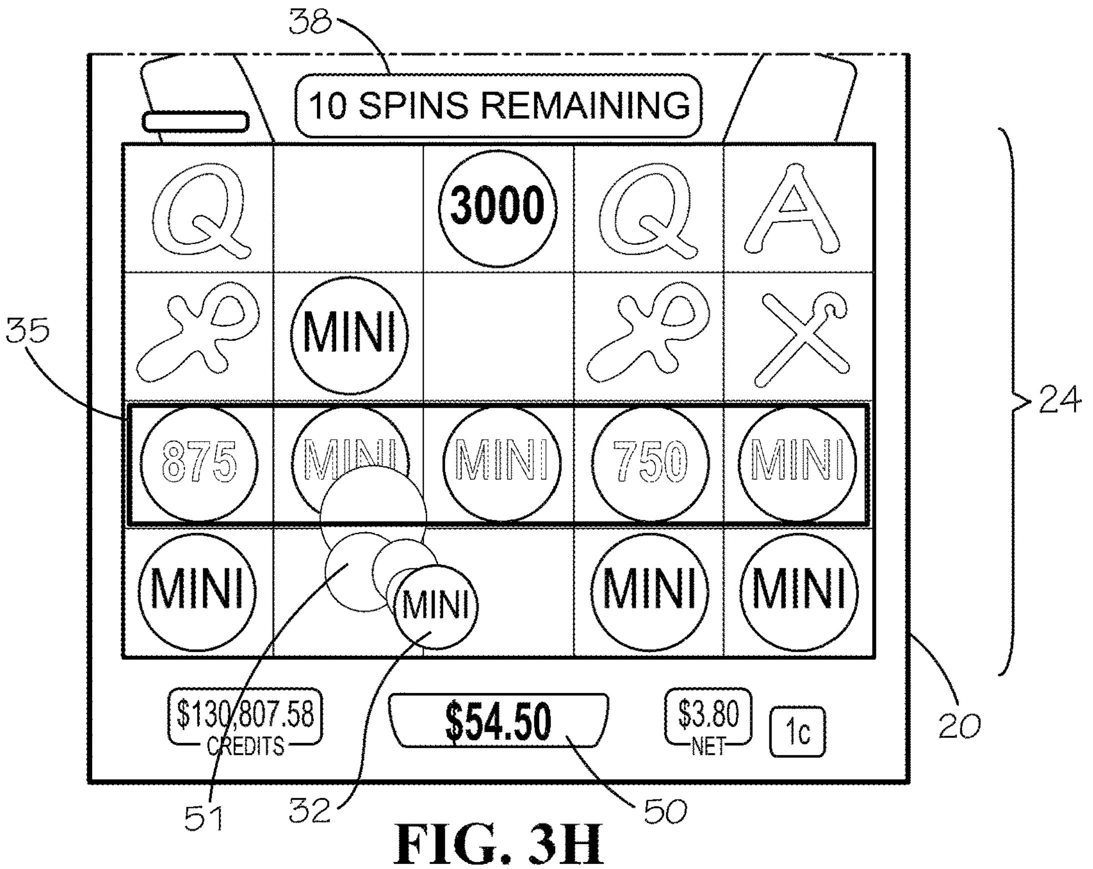

FIG. 3F further illustrates an exemplary entertaining award of the points value 34 by moving transfer of the points value to the player win accumulator 50. The illustrated amount is "1875" displayed in row 28*b*. The display of the points value in the game position 30 fades as the points value 34 moves to the player win accumulator 50. In the illustrated embodiment, the points value as shown in FIG. 3G entertainingly flashes with a flaming aura 51 during the moving transfer before being received in the player win accumulator 50 (which value has changed from $35.75 to $54.50 with the increase of $18.75 from the transferred points value 34, as shown in FIG. 3H). The originating game symbol in row 28*b* remains displayed but faded to indicate its value transferred.

Figure 3I:
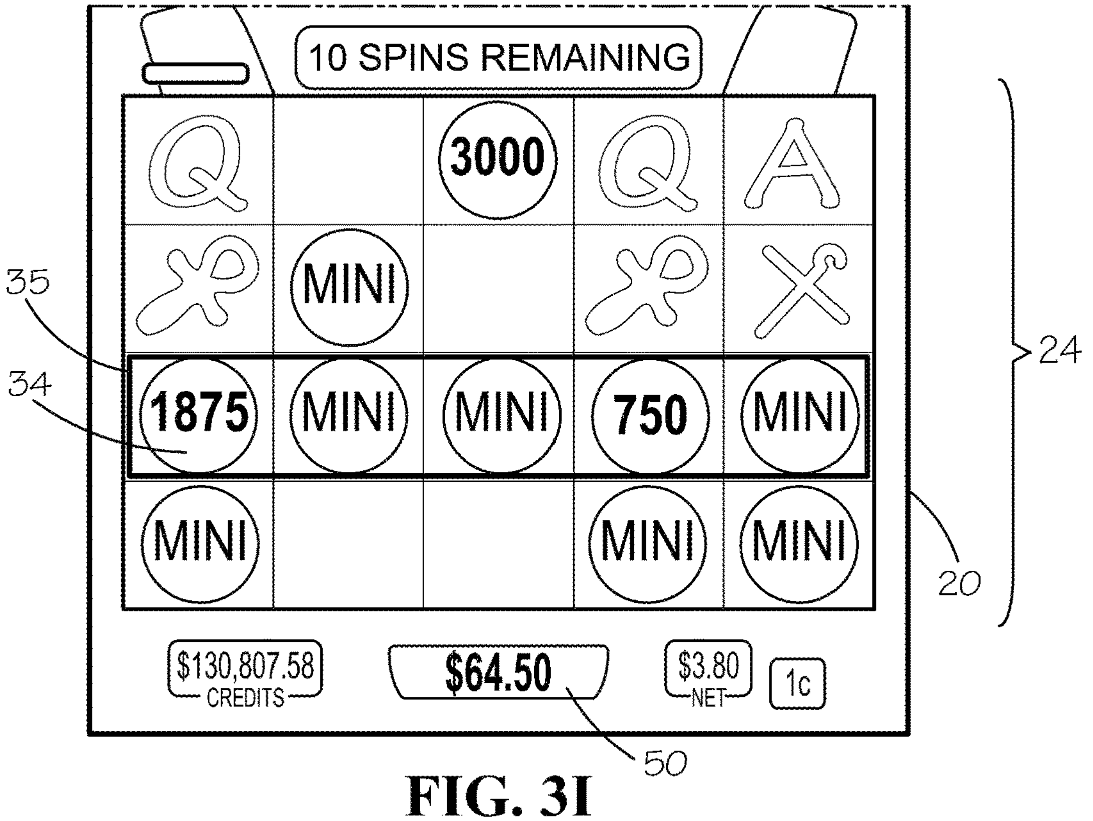
Figure 3J:
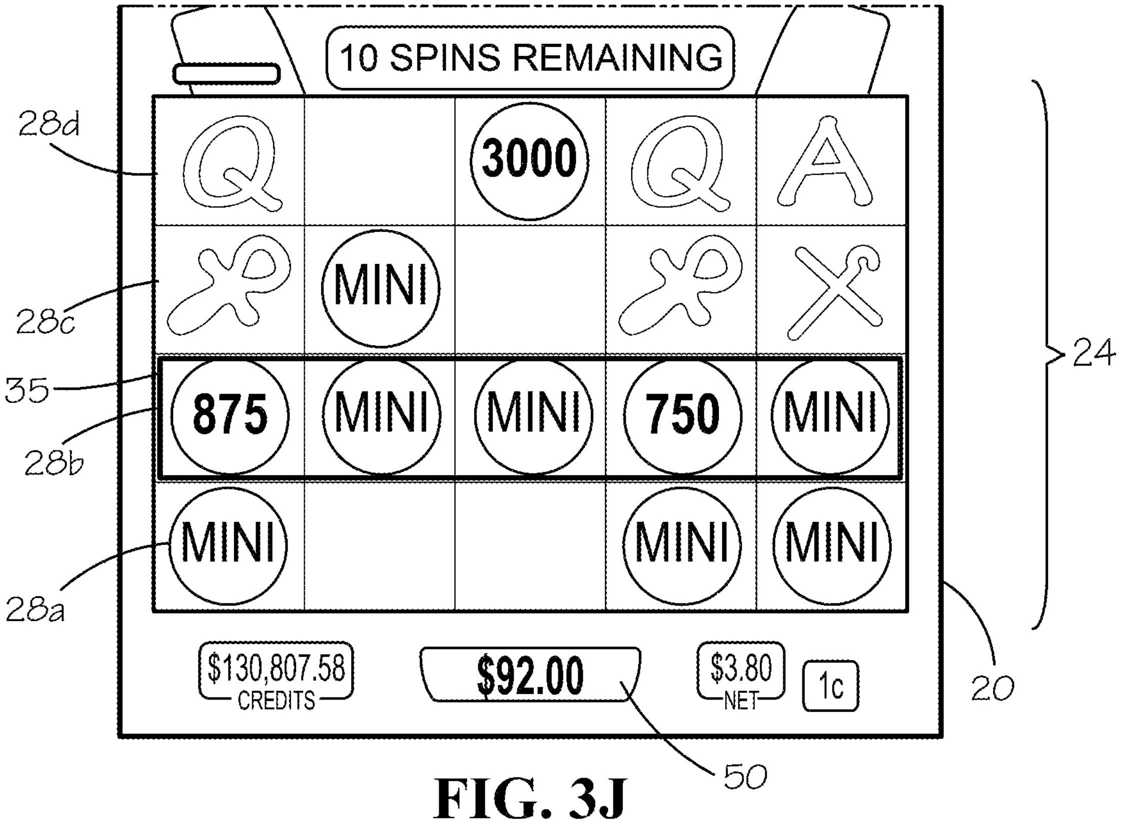
Figure 3K:
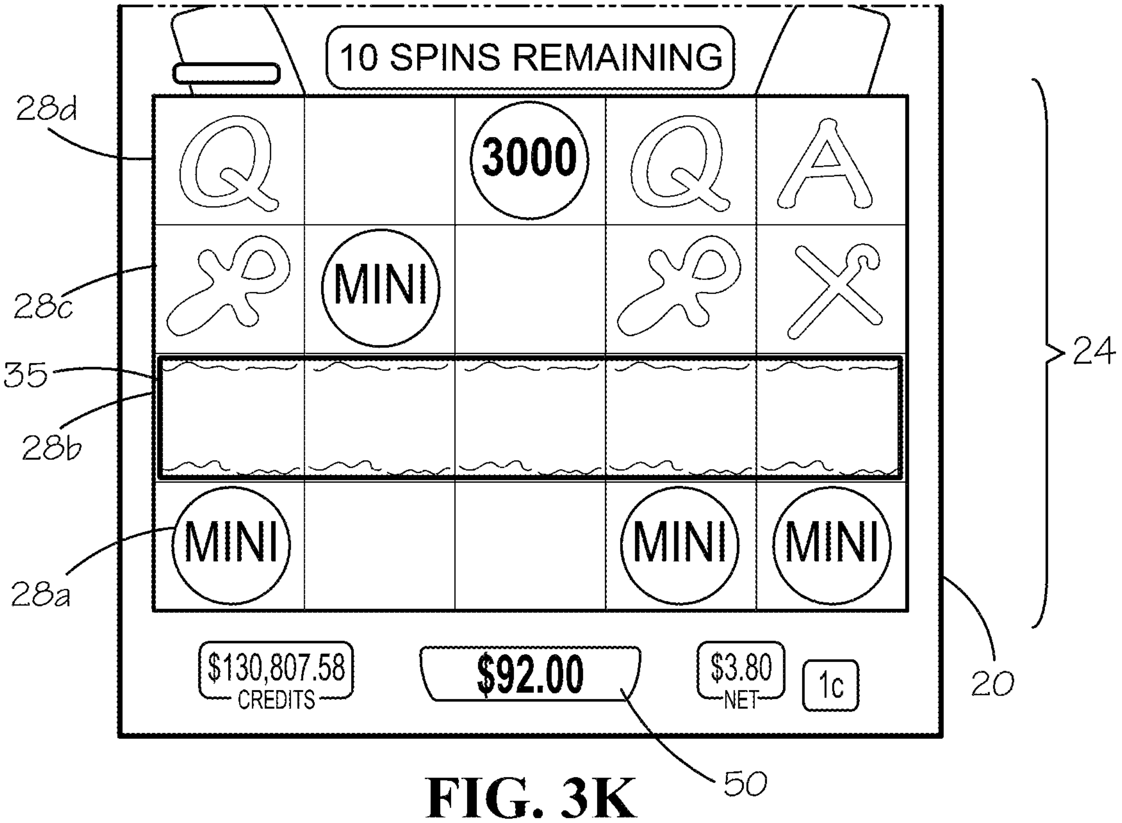

FIG. 3H similar illustrates the transfer of the amount of the prize award 32 (displaying the name "mini") by fading of the prize award 32 in the display of the play position together with the entertaining movement to the player win accumulator 50. As shown in FIG. 1, the value of a mini prize 42*b* is $10, and the increase in the player win accumulation 50 to $64.50 is illustrated in FIG. 3I. The two remaining prize award 32 and the points value 34 in the row 28*b* similar move to the player win accumulator 50. The game symbols in the play positions 30 of row 28*b* are displayed in faded presentation after completion of the transfers as shown in FIG. 3J. The game then changes the state of the respective play positions 30 in row 28*b* to open state. The faded presentations then are dissolved and vanish from presentation as shown in FIG. 3K.

Figure 3L:
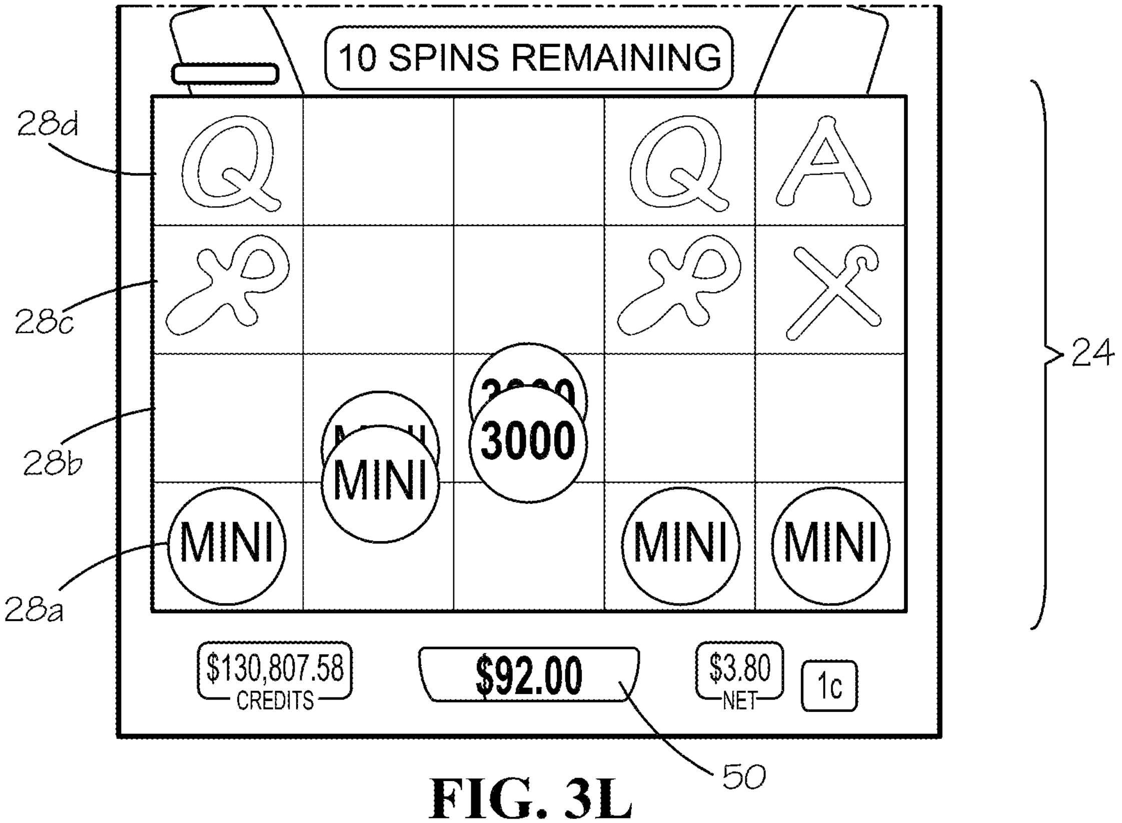
Figure 3M:
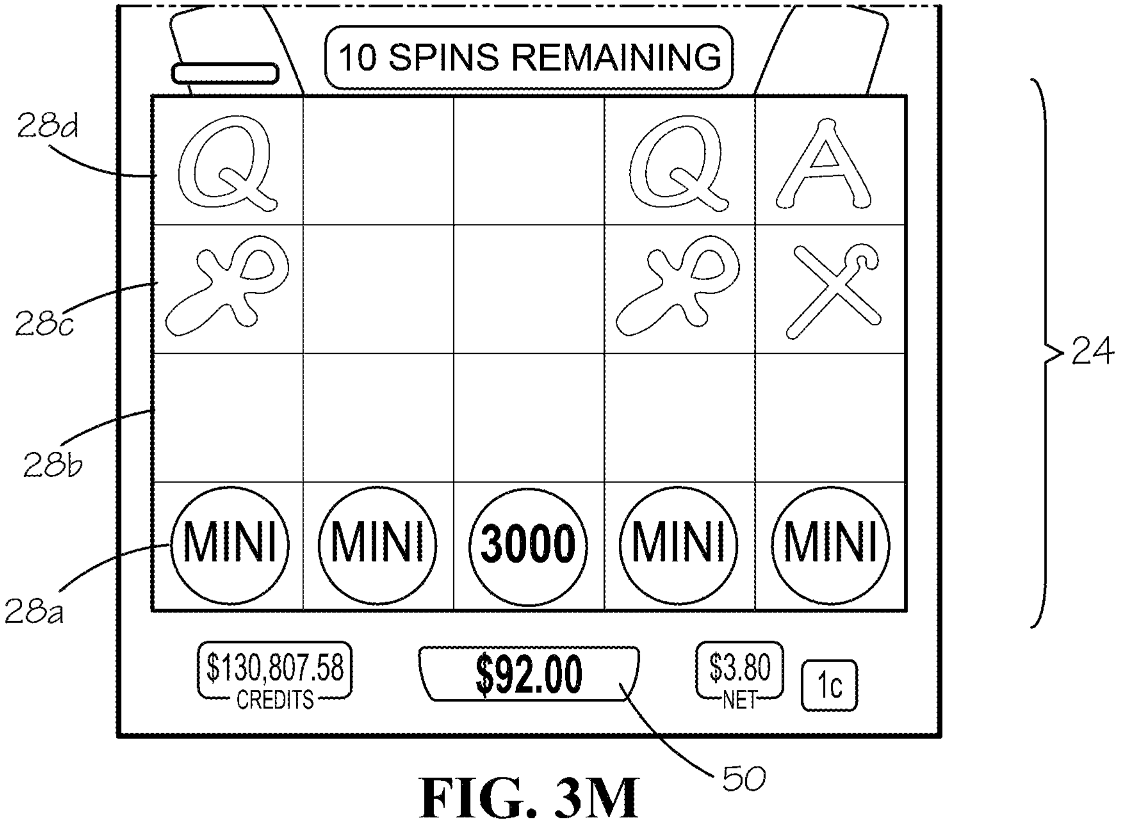

The prize awards in the rows 28*c* and 28*d* vertically higher than row 28*b* now lacking the foundation of the locked play positions in row 28*b* cascade downwardly in the respective columns to the lowermost play position having an open state, as shown in FIG. 3L. In the illustrated play, the two cascading prize awards fill the two empty play positions 30 of row 28*a*, as shown in FIG. 3M. The game resets the then newly-occupied play positions from open state to locked state. The game also resets the vacated play positions 30 from locked to open in the vertically higher row 28*c* and 28*d* for the cascaded prize awards 31, so that such play positions may receive and display game symbols from the respective reel during a subsequent play of the game. The game matrix 24 has re-adjusted the display positions 30*a* of the locked state, for continued play. The game evaluates the matrix 24 to determine whether the cascade action results in a winning combination. If so, the game proceeds to transfer the win values to the player win accumulator 50 as shown above. If the cascade results in no new winning combination, the game pauses having completed the particular play. The player may then activate a subsequent play of the game, such as having remaining plays or providing additional payment for play of the game by using a currency intake device, a credit reader device, or other value transfer device for continue play.

During play, the simulated reels 22 rotate to pass the sequence of game symbols through the matrix 24. The game symbols display in the open state play positions of the respective column associated with a reel. Thus, during rotation of the reels, the game symbols skip over the locked state play positions of the respective column.

The reels 22 stop after a rotation period. The rotation period may be predetermined, random, or selective by operation of the input button 54. The reels 22 may stop together, individually, or in groups.

The game determines whether the matrix 24 displays a winning combination of symbols (for example in the illustrated embodiment, 3 or more of the same one of the symbols 32 in one or more of the rows 28). If a winning combination results from the rotation play of the game, the award values are awarded to the player, which award values are displayed in the player award accumulator 50 or for spin value 36, incrementing the plays remaining accumulator 38. The award values 31 may be in terms of monies, tokens, additional spins, or other prize element.

In an alternate embodiment, the points value 34 awarded is multiplied by a wager value multiplier. The wager value multiplier is a first value or a second value depending on a wager amount of the player to play the game. As explained above, the player participation entry fee 52 may be selectively set by the player for play of a game. The player participation entry fee 52 may be selectively set by the player for a game with adjustors (such as a "−" for reduction and "+" for increase). The game may include a predetermined amount as a demarcation between the wager value multiplier having first value or having the second value, which first value is less than the second value.

Figure 4:
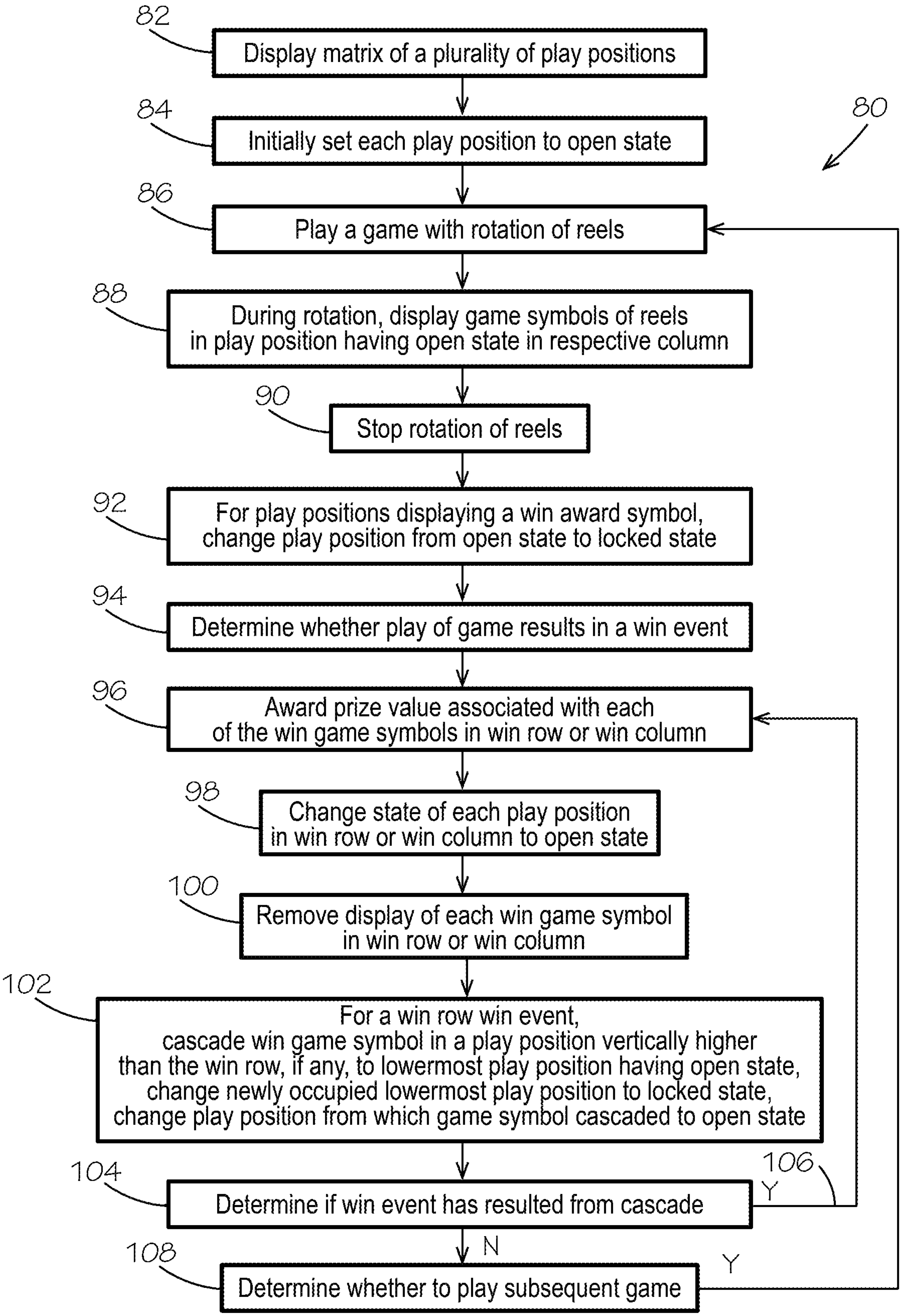
FIG. 4 illustrates an exemplary flow of game activity in accordance with the present invention.

FIG. 4 illustrates a flow chart of an exemplary process 80 for the progressive game with memory states in aligned play positions 30 leading to win opportunities for the player in subsequent play activity in accordance with the present invention. The game commences with a request by the player to play the game. This may involve the player depositing tokens, currency, credit card, or other financial transaction element in consideration of playing the game. Financial transaction structures such as token receptacles, currency receptors/validators, and credit card readers, are conventional in electronic game devices. The play of the game commences 82 with the game displaying on the display 20 the play matrix 24 of the plurality of the columns 26 and rows 28 of the play positions 30. As noted above, each column 26 defines the respective vertical stack of play positions 30 while laterally adjacent play positions in each vertical stack defines the respective rows 28 of play positions. The game initializes 84 each play position 30 to the open state.

The game then operates 86 the play of the game with simulated rotation of the plurality of reels 22. Each reel 22 corresponds with a respective one of the columns 26. The rotation passes the plurality of sequential positions through the column of the matrix 24. The reel positions display the sequential game symbols distributed on the reel, which game symbols are of the first type for an award upon the game win by the player or the second type of game symbol for display in the matrix. The second type of game symbol may be letters, characters, graphics of entertaining interest, or the like. The game displays 88 the game symbols of the reels 22 in the respective column 22 in the play positions 30 having the open state. The open state identifies the play position for receiving and displaying the game symbol of the reel upon the play of the reel game. Play positions with the locked state are holding and displaying the game symbol of the first type received during a play of the reel game. The rotation of the plurality of rotatable reels passes the game symbol positions sequentially in the respective column 26 of the play matrix 24 and displays the game symbol in the respective play positions sequentially having the open state together with display of the game symbol of the first type in the play position having the locked state.

The game completes 90 the rotation of the reels. The game changes 92, for each play position 30 having the open state and displaying the game symbol of the first type, the state from the open state to the locked state. The game determines 94 whether the play of the game results in a win event. In one aspect, a win event may occur for one or more of the rows 28 or for one or more of the columns 26. The row 28 is a win row win event when the outcome of the play of the game results in each play position 30 in the row displays the game symbol of the first type in each column. A column 26 is a win column win event when the outcome of the play of the game results in each play position in the column displays the game symbol of the first type for each row. For a win event, the game awards 96 the prize value associated with each of the game symbols of the first type in the win row or the win column. The game changes 98 the respective state of each play position 30 in the win row or the win column from the locked state to the open state. The game removes 100 the display of each game symbol in said win row or said win column. This makes the respective play position available for receiving, displaying, and potentially holding, a game symbol during a subsequent play of the game.

For the win row win event, the game cascades 102 any game symbol of the first type in a play position 30 in a respective one of the columns 26 that is in the stack vertically higher than the win row, if any. The displayed game symbol falls in the stack to the sequentially lowermost available play position 30 having the open state. The game changes the sequentially lowermost play position to the locked state and the game changes the state of the play position from which the game symbol to the open state. This closes the newly occupied play position from subsequent receiving and displaying game symbols during a subsequent play of the game and opens the formerly closed game position for receiving and displaying game symbols during the subsequent play of the game. The game thereby provides structure for varying the display of game symbols of the rotating reels during play of the game.

The game then determines 104 whether the cascaded matrix 24 resulted in a win event, and if so the game processes 106 the win event. Otherwise, the player may operate 108 the input button 54 for play of a subsequent game using the displayed game symbols in the play positions having the locked state and displaying the sequential game symbols during reel rotation in the play position having the open state, for a game play result.

Figure 5A:
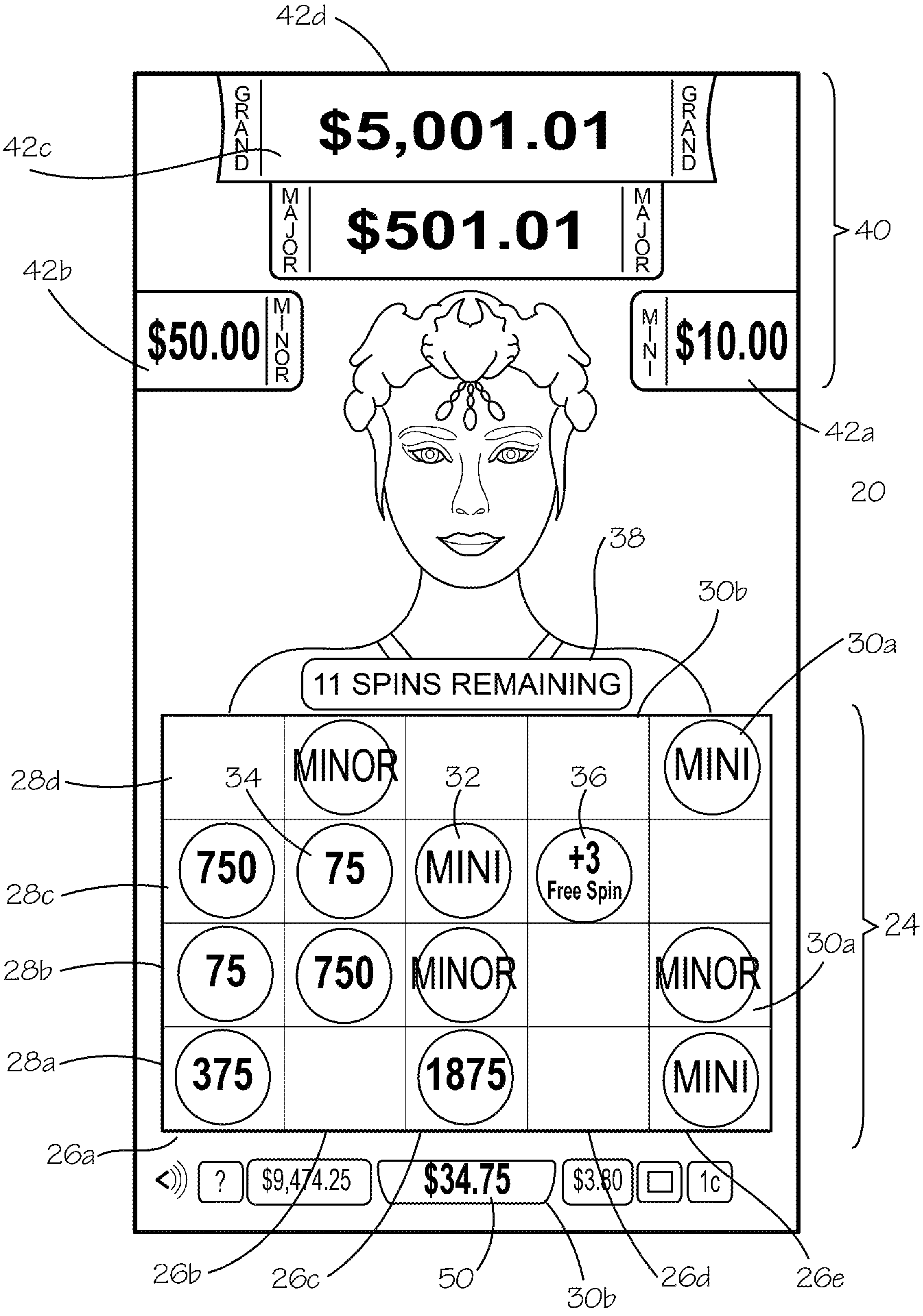
FIG. 5A illustrates a display of a game machine for displaying play actions of a progressive reel-type game with memory states in aligned play positions for entertaining play by players in accordance with the present invention.

FIG. 5A illustrates the display 20 of a game machine for displaying play actions of a progressive reel-type game with memory states (locked or open in accordance with the present invention) in the play positions 30 in the matrix 24 for entertaining play for a game player in accordance with the present invention. FIGS. 5B-5H illustrate a respective detailed portion of the display 20 showing an exemplary winning outcome of a simulated rotation of the reels 22 displayed as columns 26 in rows 28 of the matrix 24 during play of the progressive reel-type game with memory states in play positions 30 of the matrix and resulting game actions during a play of the game machine illustrated in FIG. 5A. The matrix 24 in the illustrative game has four rows 28*a*, 28*b*, 28*c*, and 28*d* and five columns 26*a*-26*d*. The columns 26 correspond with a respective reel 22. The respective play positions 30*b* having an open state display sequentially the game symbols of the respective reel during rotation of the reels during play of the game. The respective play positions 30*a* having a locked state display the received win award during a prior play of the game.

Figure 5B:
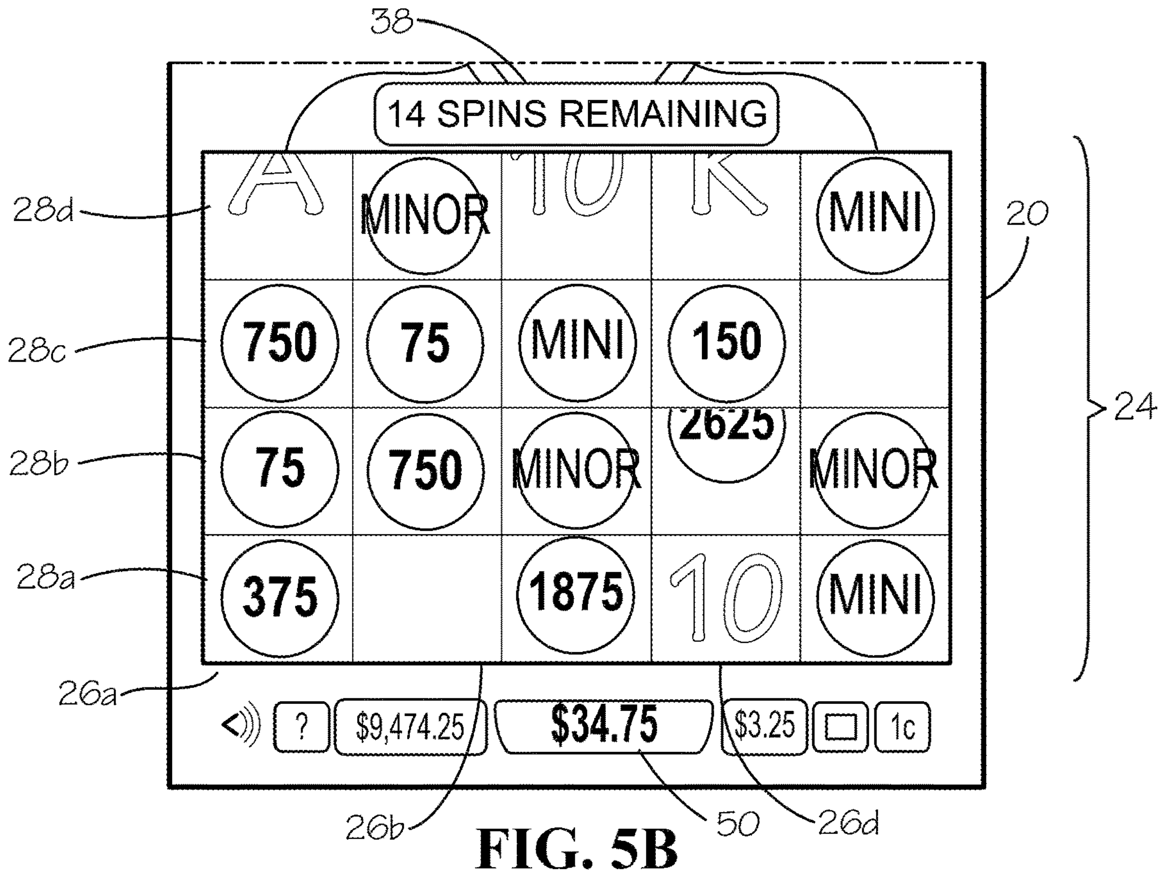
FIG. 5B-5H illustrate a respective detailed portion of the display showing an exemplary winning outcome of a simulated rotation of the reels during play of a progressive reel-type game with memory states in aligned play positions and resulting game actions during a play of the game machine illustrated in FIG. 5.

FIG. 5A illustrates an exemplary state of the matrix 24 after an immediately preceding rotation of the reels 22 during play of the game. Rows 28*a*, 28*b*, and 28*c* are partially complete with three play positions 30*a* displaying prize awards 32 in row 28*a* and four play positions 30*a* displaying prize awards 32 in row 28*b*. These play positions have locked states. Row 28*d* displays two prize awards 32 which likewise hold a locked state. The player is excitedly interested in the game as four of the columns 26*a*, 26*b*, 26*c* and 26*e* are substantially complete each having three play positions with a locked state award in the respective column and one remaining open state play position for display of a game symbol of the respective reel during a subsequent play of the game. And the player has remaining spins available for continued play of the game as shown by the remaining plays counter 38. The spin award 36 is processed to display movingly towards the spin remaining counter 38 and increments the counter by 3 based on the spin award 36. The spin award 36 flips and returns to its original points value 34 as shown in FIG. 5B. There is no completed row or column; the player has spins remaining, and operates the input button 54 to spin the reels 22 for another play of the game.

Figure 5C:
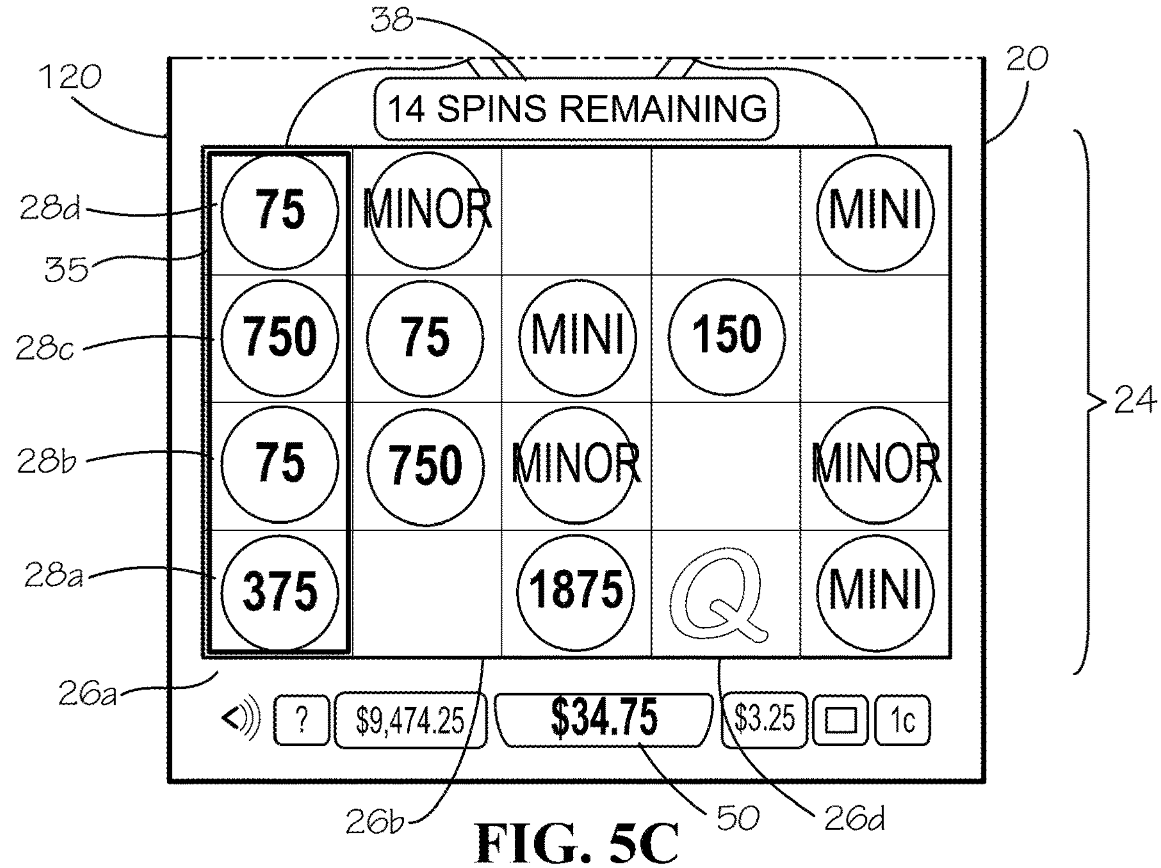

5B illustrates the detailed portion of the display 20 during a rotation of the reels 22 with display of a game symbol of the respective reel in at least some of the available open state play positions 30*b* in the matrix 24 (see row 28*b*, column 26*d* displaying a portion of a game symbol for a points value 34 during rotation of the reels in the play of the game). FIG. 5C illustrates the end of the rotation during the play, with the open position in column 26*a* now filled with a respective win award of a points value 34 displaying a value of 75 points. The play position of this newly held award game symbol is changed from open state to locked state.

Figure 5D:
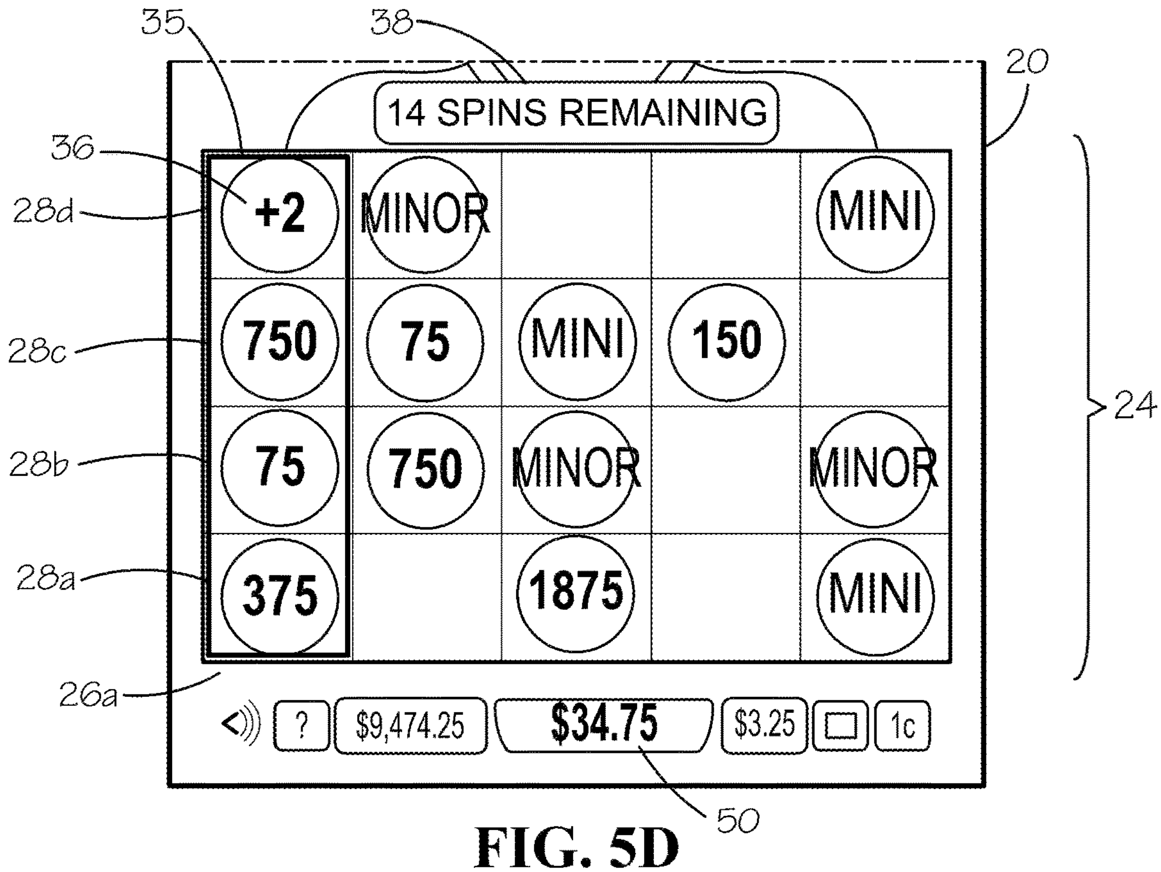
Figure 5E:
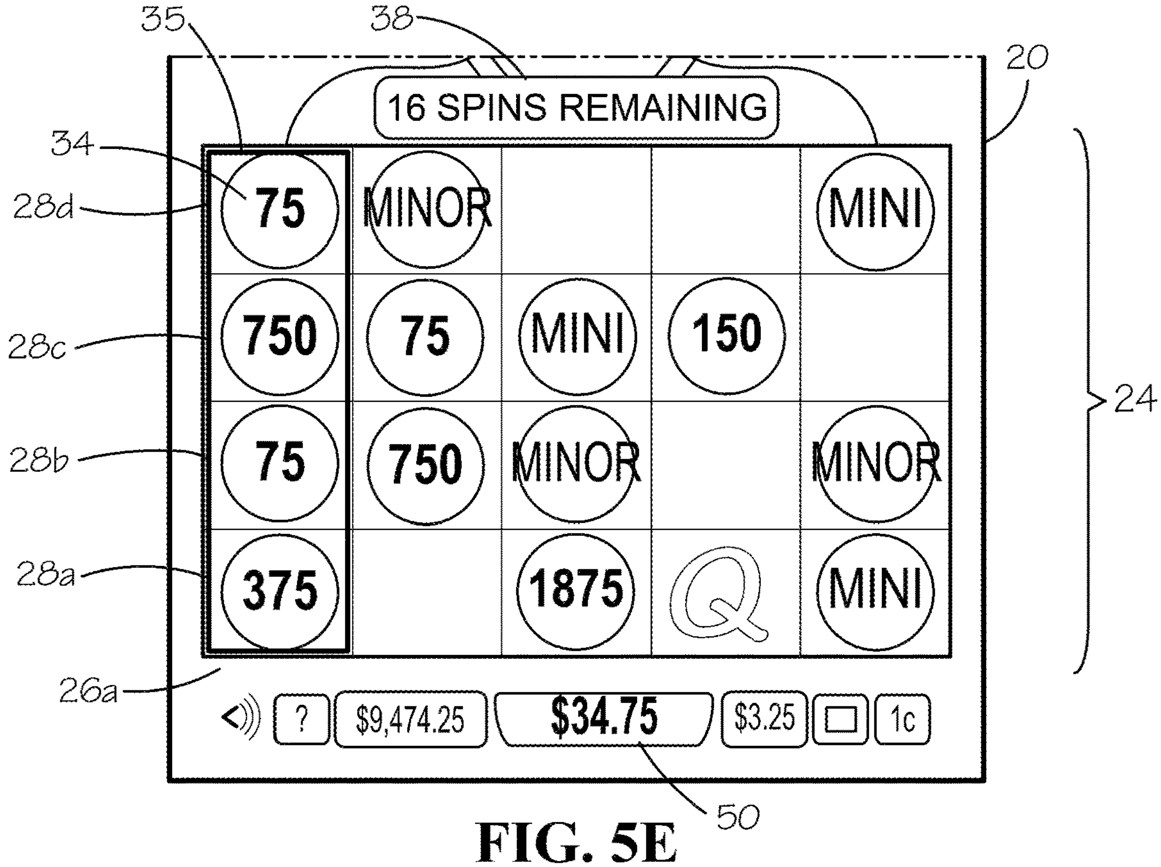

FIGS. 5C and 5D also illustrate a feature aspect of the game. The award game symbol may further include additional free spins. In this illustration, the points value coin displaying 75 points (FIG. 5C) flips over to display that the player has immediately achieved additional spins (FIG. 5D) (in the illustration, the award symbol is a coin that displays 2 additional spins). The spin value transfers as discussed above displayingly moving across the matrix 24 to, and increments, the plays remaining counter 38, as shown in FIG. 5E. The newly received win award flips back to show the points value award. The amount of the points value award is awarded to the player upon determination of the respective column being a win column or a determination that the respective row is a win row.

Figure 5F:
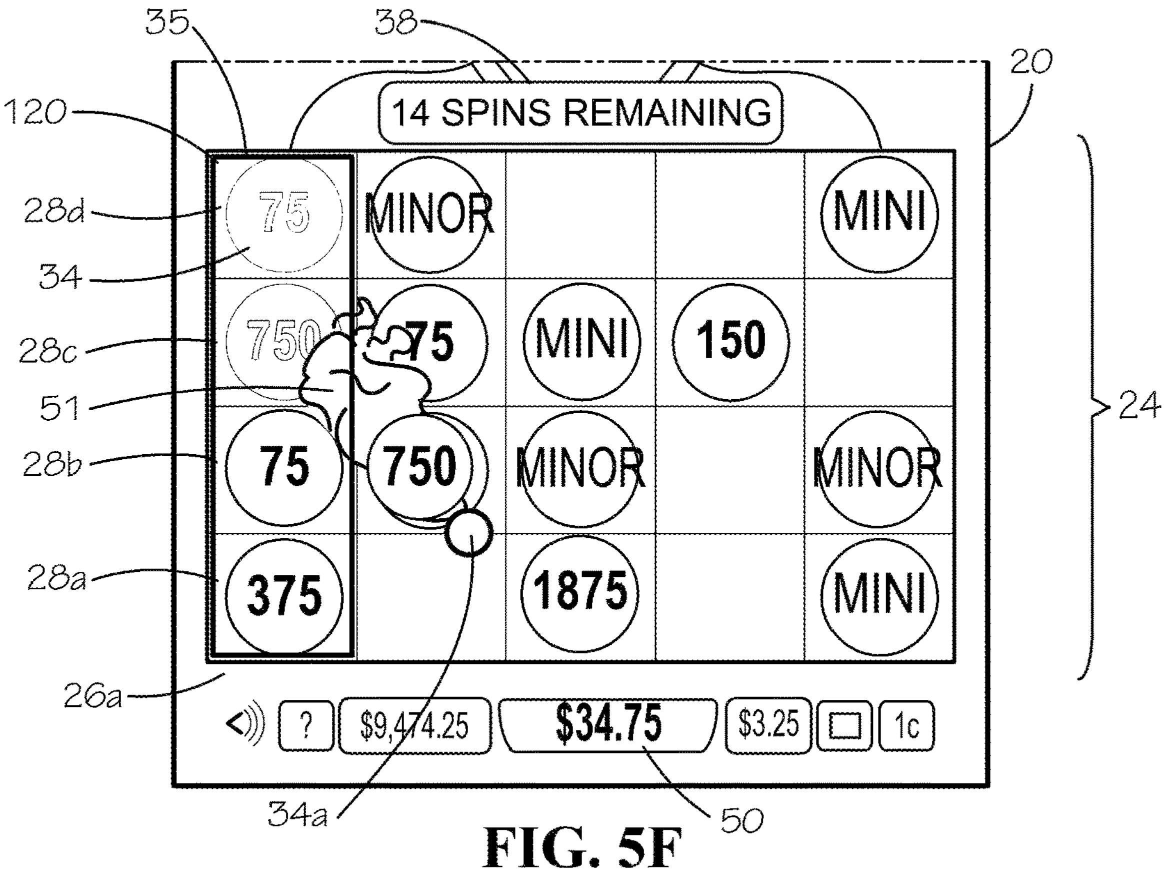

The game then determines whether a win event has occurred. A win event may be a win column or a win row. In the illustrative display, the column 26*a* holds win awards in each of the column play positions. In the illustrated embodiment, the game determines that column 26*a* is a win column. (The game may highlight the win column such as with a border 120, as shown initially in FIG. 5C to bring the win event to the attention of the player.) The game then transfers the values of the win awards in the win column to the player accumulator 50. As shown in FIG. 5F, the values transfer occurs sequentially down the column. The transfers however alternatively may be displayed moving up the column, randomly of one play position and then another of the remaining play positions, or sequentially such as from low value to high value or from high value to low value.

Figure 5G:
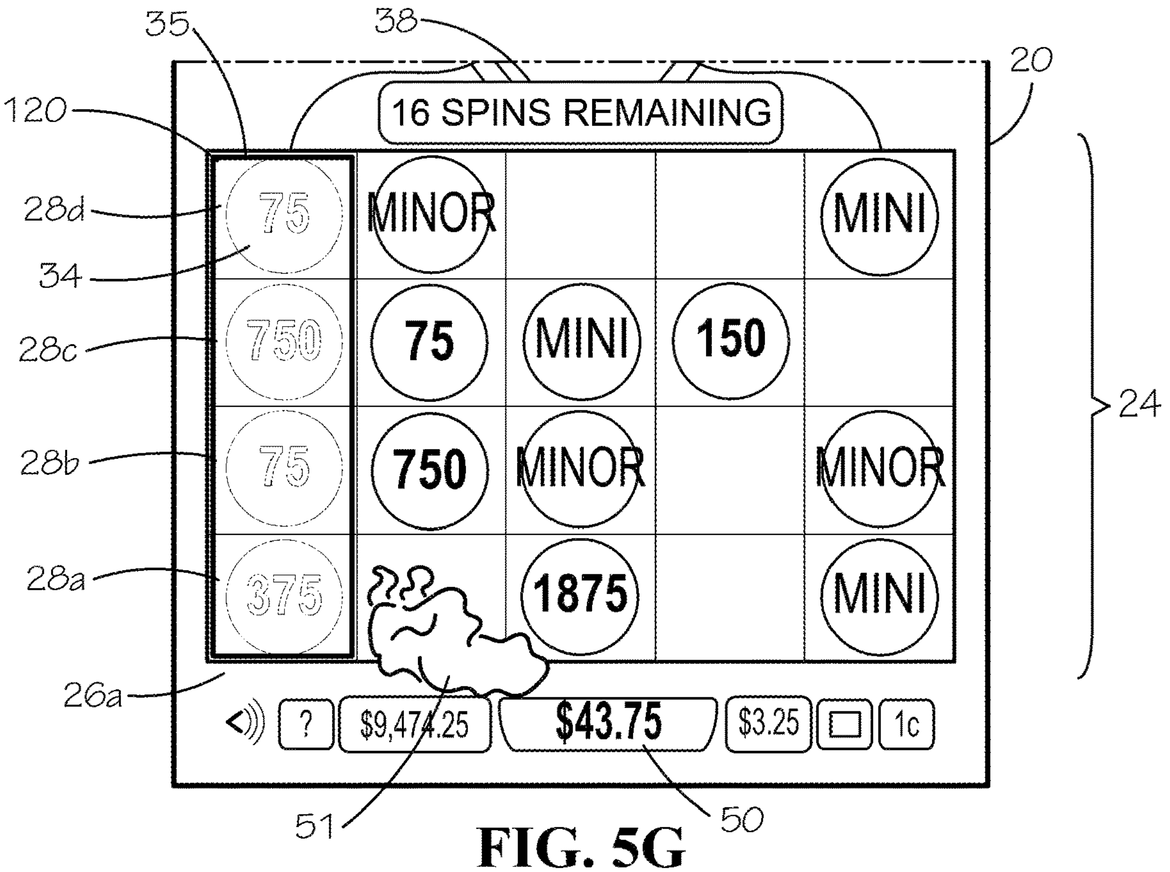

As shown in FIG. 5F, the points value prize win in row 28*d* is shown transferring by exciting movement of a coin symbol and value (see reference 34*a*) as discussed above. The win award depicted in the play position 30*a* is displayed as faded to distinguish from play positions for values yet to be transferred for an award to the player and incrementing of the play award accumulator 50. The movement may include an explosive flame or glowing blaze 51 accompanying and trailing as the points value moves across the matrix 24. This gives the player an entertaining and action display for the award. Other entertaining actions may accompany the movement, for example, but not limited to flashes, displays of moving coins or other symbols, and audio sounds. The remaining values in the win column 26*a* similarly transfer to the player award accumulator 50, until as shown in FIG. 5G, the play positions 30 in the win column 26*a* are displayed as faded to indicate transfer of the win values.

Figure 5H:
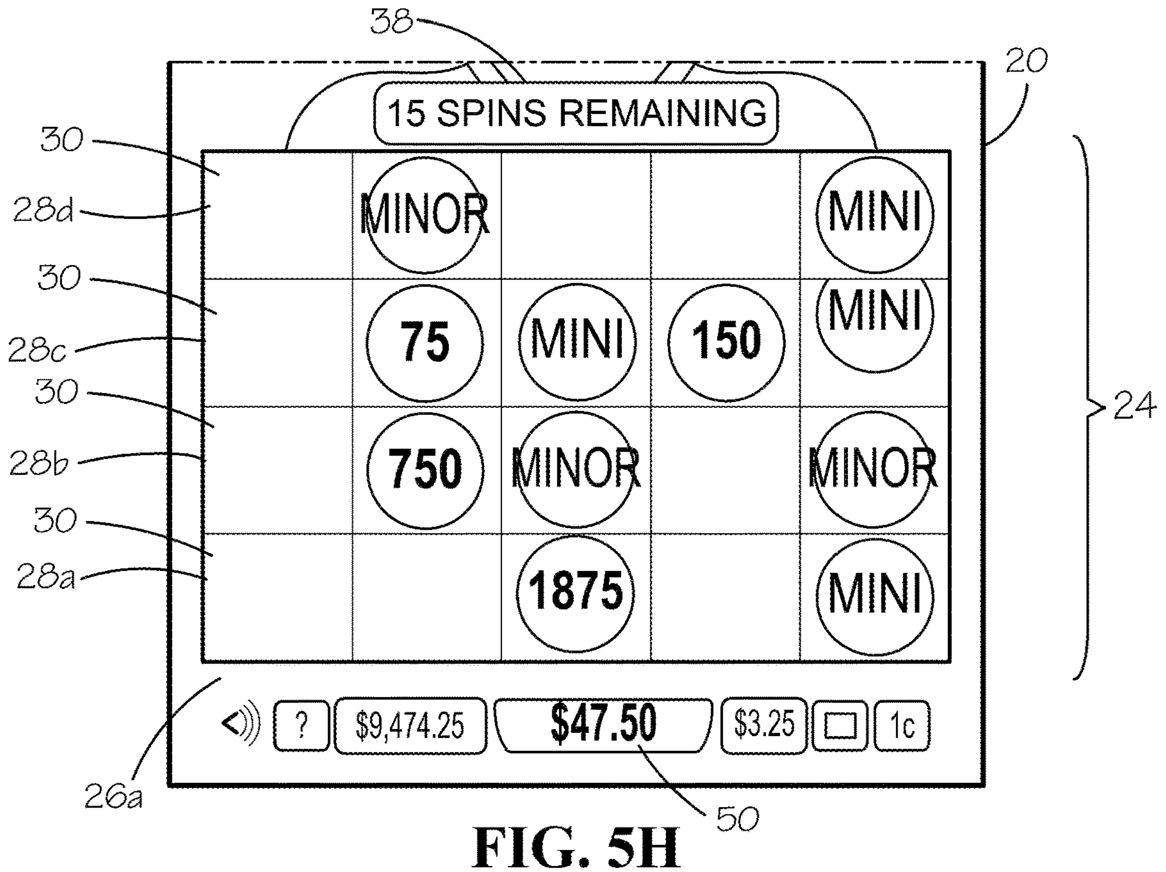

The game then changes the state of the play positions 30 in the win column 26*a* from locked to open state. The game clears the faded award symbols from the play positions 30 in the win column 26*a* shown in the display of the matrix 24, as shown in FIGS. 5G and 5H. The game then determines if the resulting matrix 24 has another win event of a win column or win row for awarding the award values to the player. If not, the game is ready for subsequent request for play of the game with reels rotation.

The game may have selected predetermined win criteria for award of prizes as the win row or win column. For example, a game may have a win criteria for a row or column to display three or more game symbols of the first type in order to award prize values. With such criteria, for example, a 5-column matrix may have a row that holds after rotation ends three game symbols of the first type and the other two columns may be empty or have game symbols of the second type. Under such criteria, the row has a row win event. Similarly, other embodiments may require a particular number of the columns or require all columns display game symbols of the first type to be a win row. Similar criteria may apply for determining whether a column matches as a win column (i.e., a column has award values for all rows or some predetermined number of rows display game symbols of the first type in one or more columns.)

In another alternate embodiment, the criteria may require a winning display of game symbols of the first type be displayed in specific play positions of a row or column. For example, in a five-column matrix, a win row must have game symbols of the first type in the middle three columns irrespective of the game symbols displayed in the first or fifth column, in order to be a win row. Similarly, a win column may be characterized in an alternate embodiment as having specific ones of the rows holding a win award.

FIG. 1 illustrates an alternate embodiment of the game that during plays maintains a win count 55. In this embodiment, the game increments the win count for each win row or win column achieved by the player during play. The win count 55 displays the number of wins a player has achieved during sequential plays of the game after initiation of a first request to play. Upon the win count 55 reaching a predetermined value, the player is awarded an achievement award. Upon award, the game may re-set the win count and commence incrementing anew. Alternatively, the win count continues incrementing with each additional win row or win column, for subsequent achievement awards at respective win count levels. For example, an achievement award may be the awarding of the grand prize 42*d*.

Figure 6A:
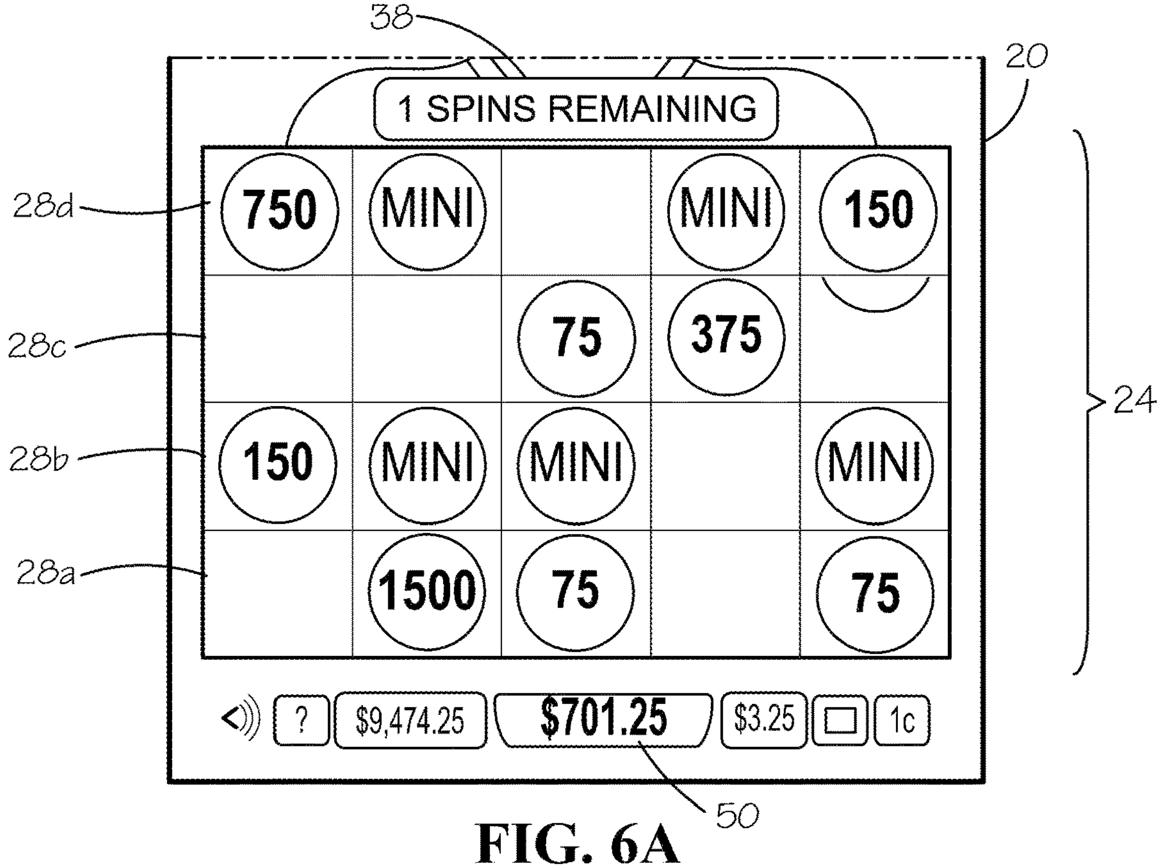
FIGS. 6A-6C illustrate an exemplary closing of play of the reel-type progressive reel-type game with memory states in aligned play positions in accordance with the present invention.

FIGS. 6A-6D illustrate an exemplary closing of play of the reel-type game for further exciting play action to encourage continued play by the player of the progressive reel-type game with memory states in aligned play positions in accordance with the present invention. FIG. 6A illustrates an exemplary state of the matrix 24 after an immediately preceding rotation of the reels 22 during play of the game. The rows 28 and columns 26 are partially complete with play positions 30*a* displaying prize awards. These play positions have locked states. The player is excitedly interested in the game as various of the rows and columns are substantially complete for qualification of a win event. The plays remaining counter 38 displays 1 spin remaining. The player operates the input button to commence play with simulated spinning of the reels and display of the game symbols on the respective reel in the respective column having play positions with an open state.

Figure 6B:
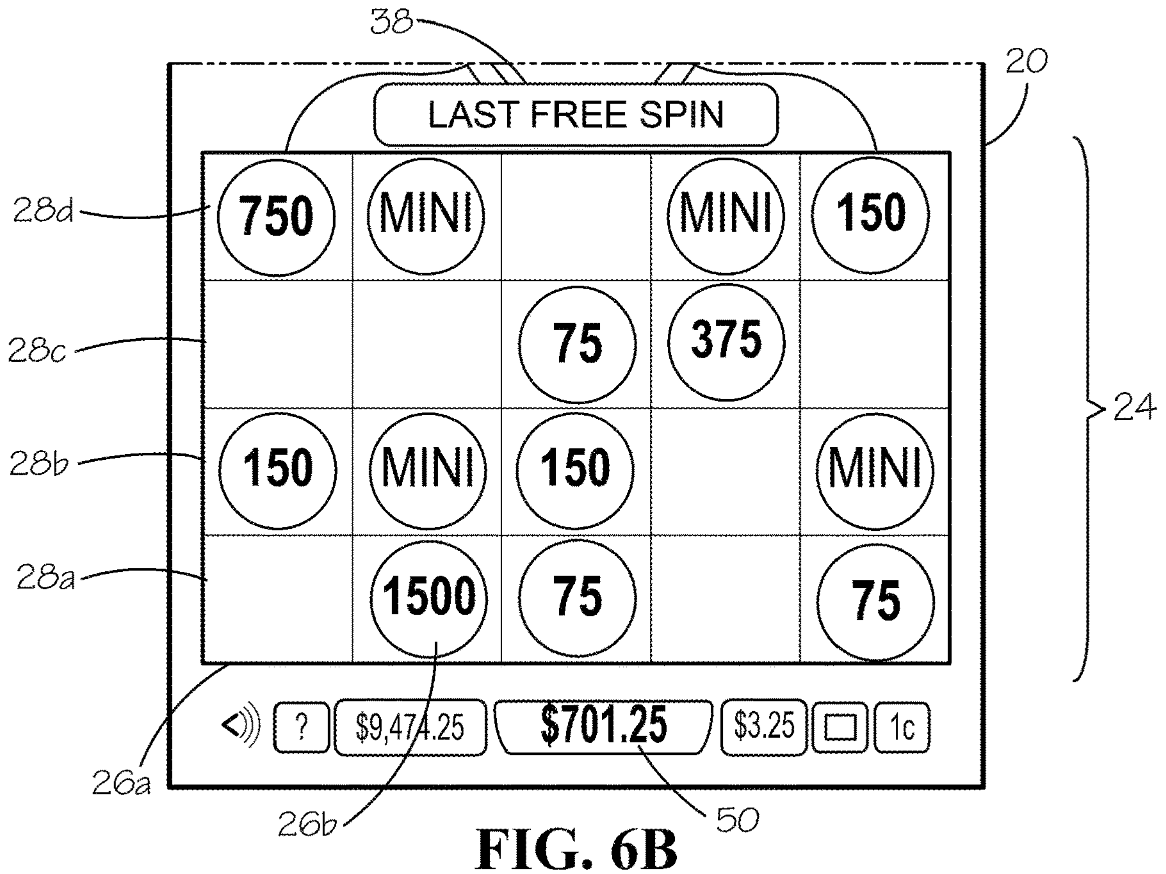
Figure 6C:
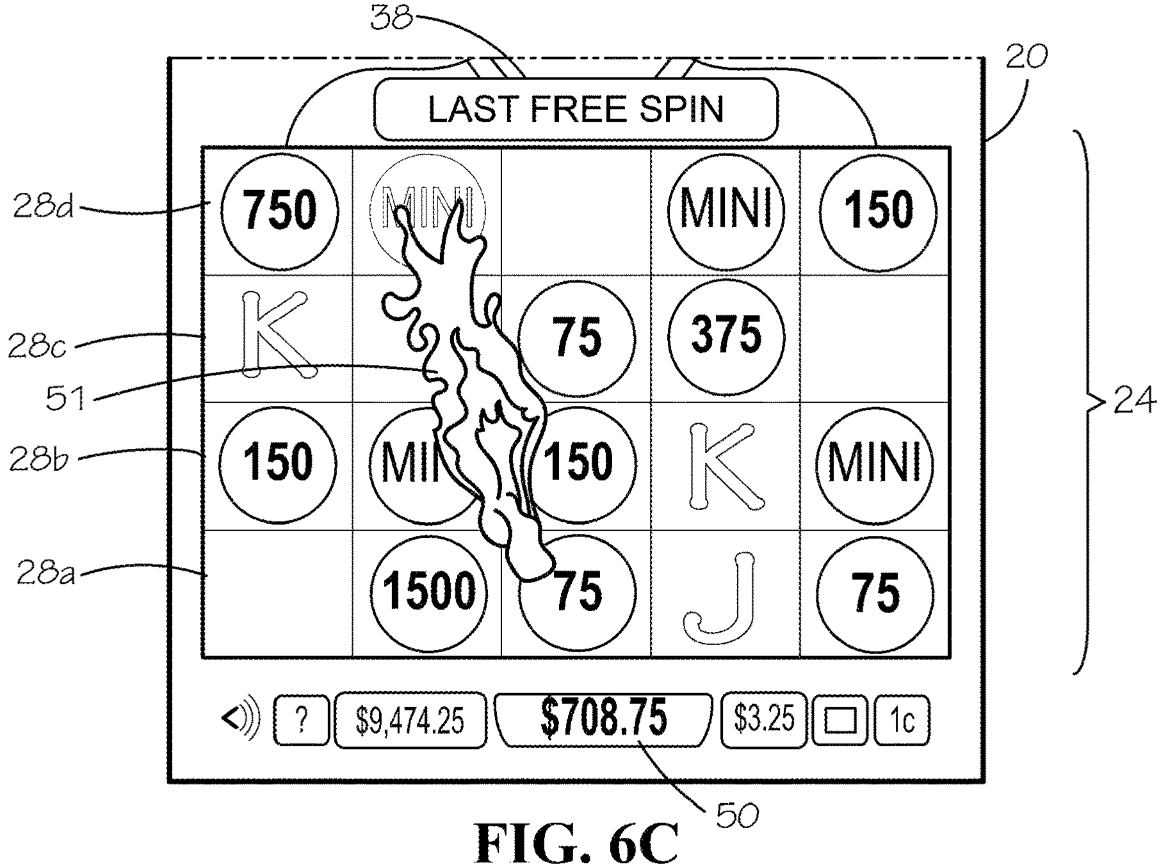
Figure 6D:
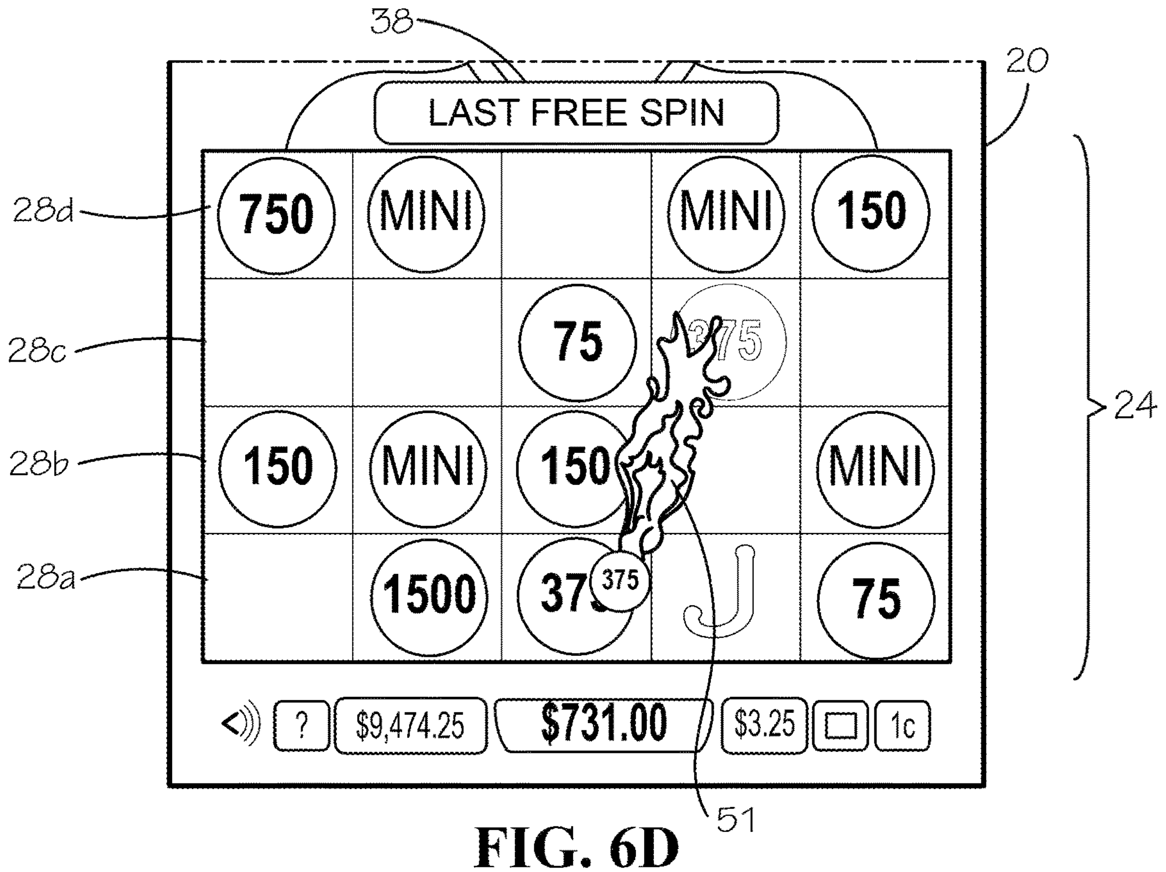

As shown in FIG. 6B, the plays remaining counter 38 displays a message that the spin rotation is the last of the player's available spin play opportunities. Further, FIG. 6B displays no new win award symbols are received in the play positions having open states as a result from the spin play of the game. The game is over and the player would need to initiate play again with a payment or token to continue plays. To encourage continued play, the game in the illustrated embodiment awards the values of the win awards displayed in the locked state play positions of the matrix 24. As shown in illustrative transferring movements, the game awards the respective win awards, for example, transferring the "mini' prize to the player accumulator 50 (FIG. 6C) and transferring the points values to the player accumulator 50 (FIG. 6D).

Figure 7A:
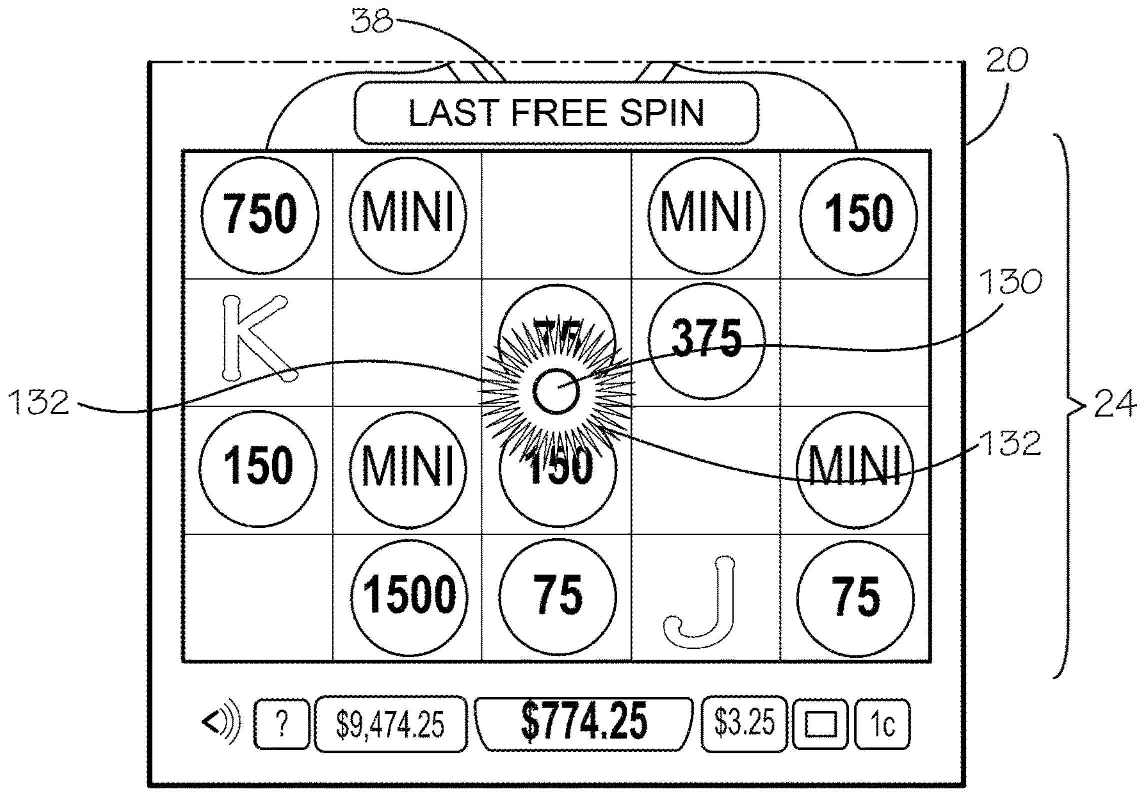
FIGS. 7A-7C illustrate an exemplary announcement during a conclusion of the game of the achievement of the player for further exciting encouragement for play of the game.
Figure 7B:
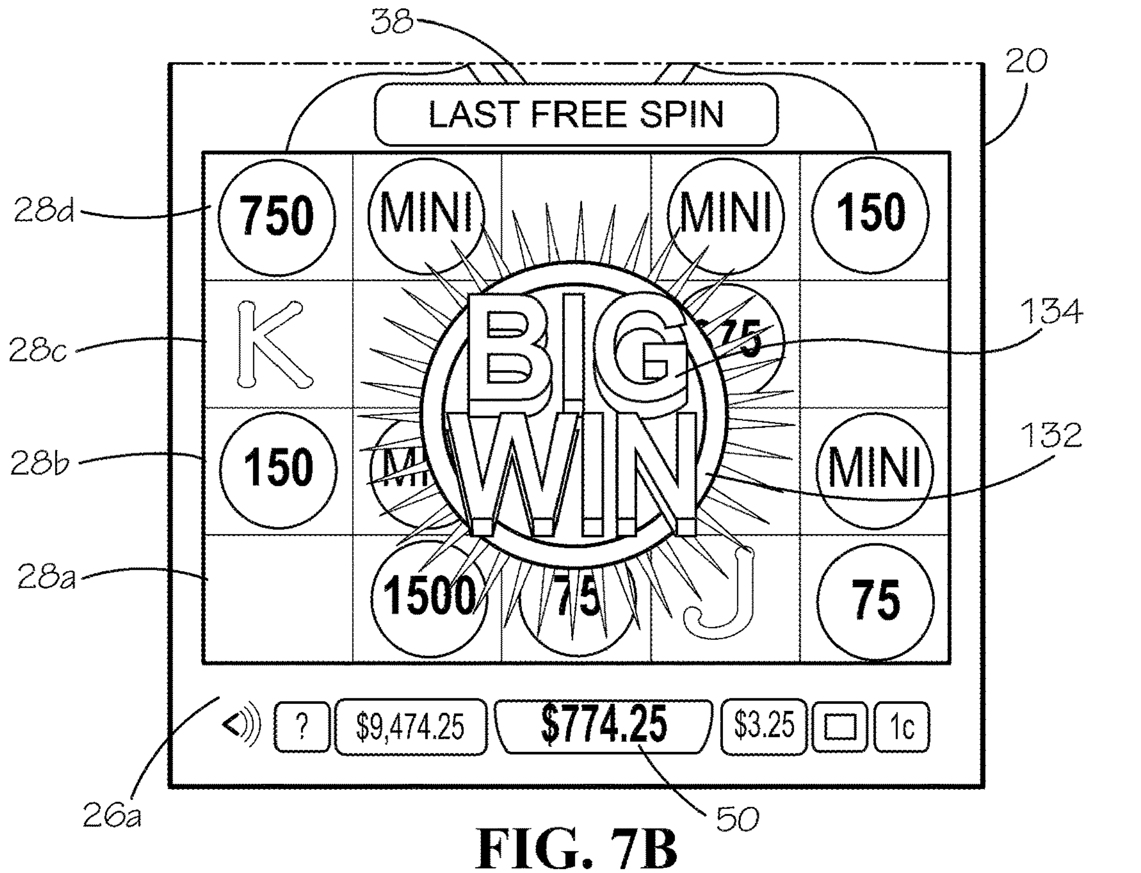
Figure 7C:
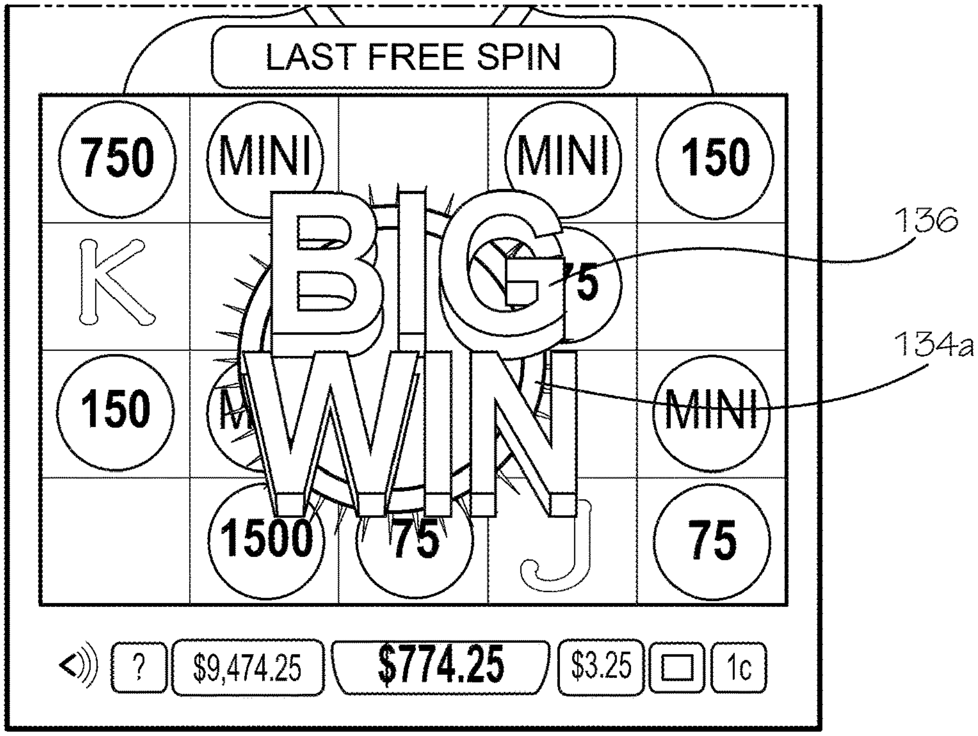

In reference to FIGS. 7A-7C, the illustrative game then announces the achievement of the player for further exciting encouragement for play of the game. FIG. 7A illustrates the display 20 showing the awarded win awards and features a central bursting star 130 featuring extending rays 132. The bursting star 130 then displays as shown in FIG. 7B a laudatory message 134, in the illustrated embodiment but not limiting, the message of "Big Win" in recognition of the awards won by the player during play of the game. The game enhances the displayed laudatory message 134*a* as shown in FIG. 7C and a surrounding luminescent glow or cloud 136 for entertaining presentation to the player.

Figure 8A:
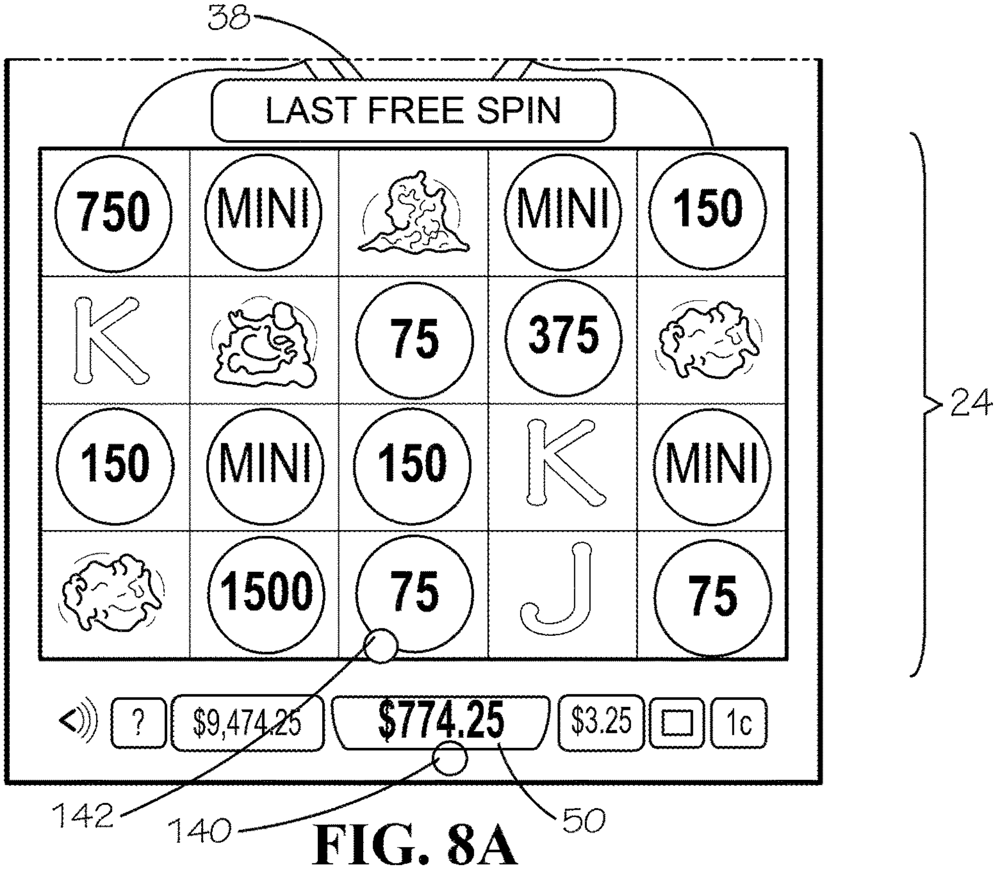
FIGS. 8A-8D illustrate a spouting fountain of a plurality of representative symbols for an entertaining and encouraging conclusion to the play of the game.
Figure 8B:
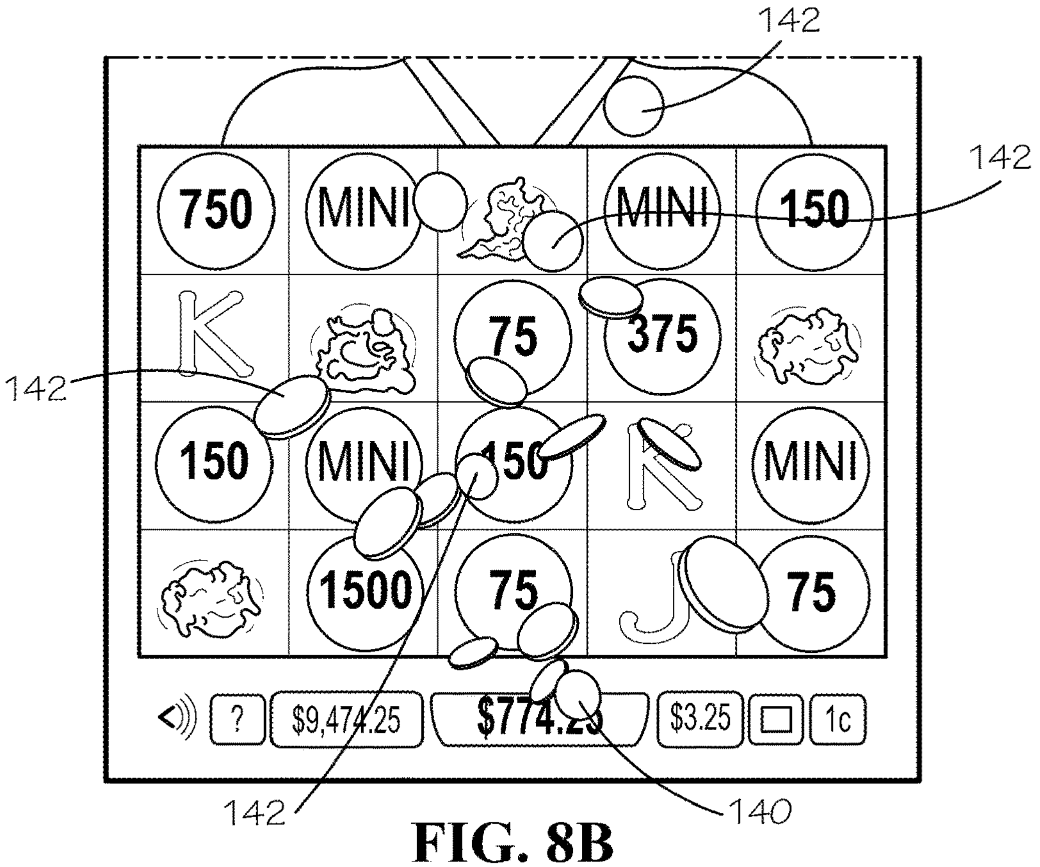
Figure 8C:
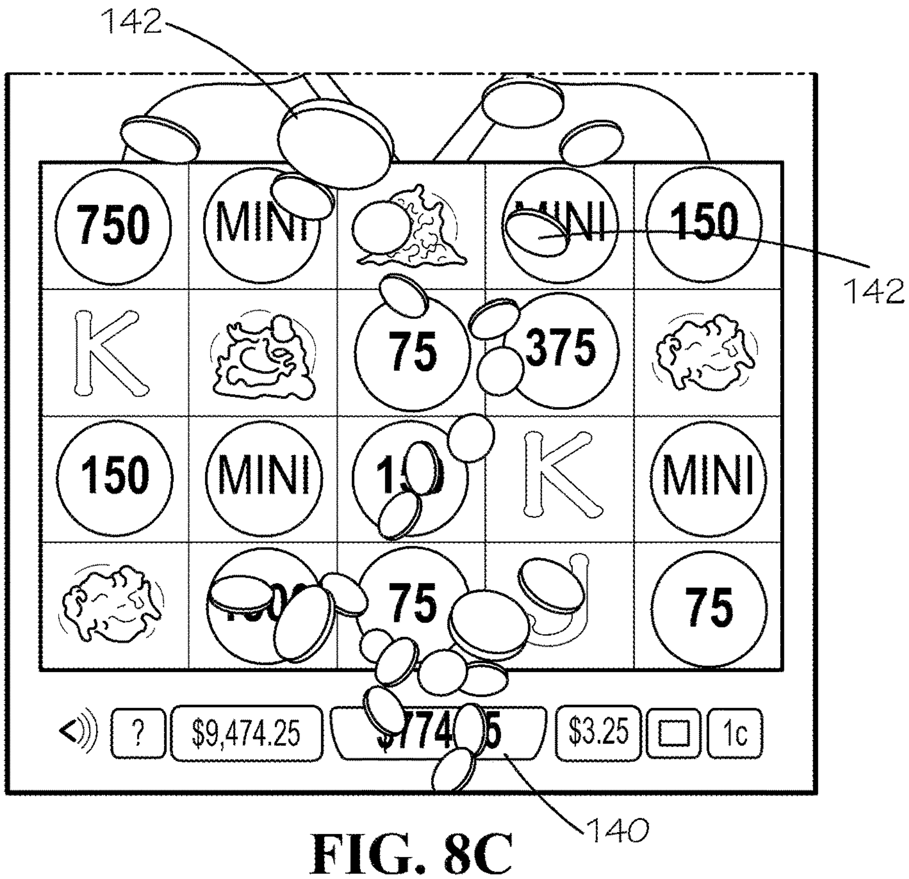
Figure 8D:
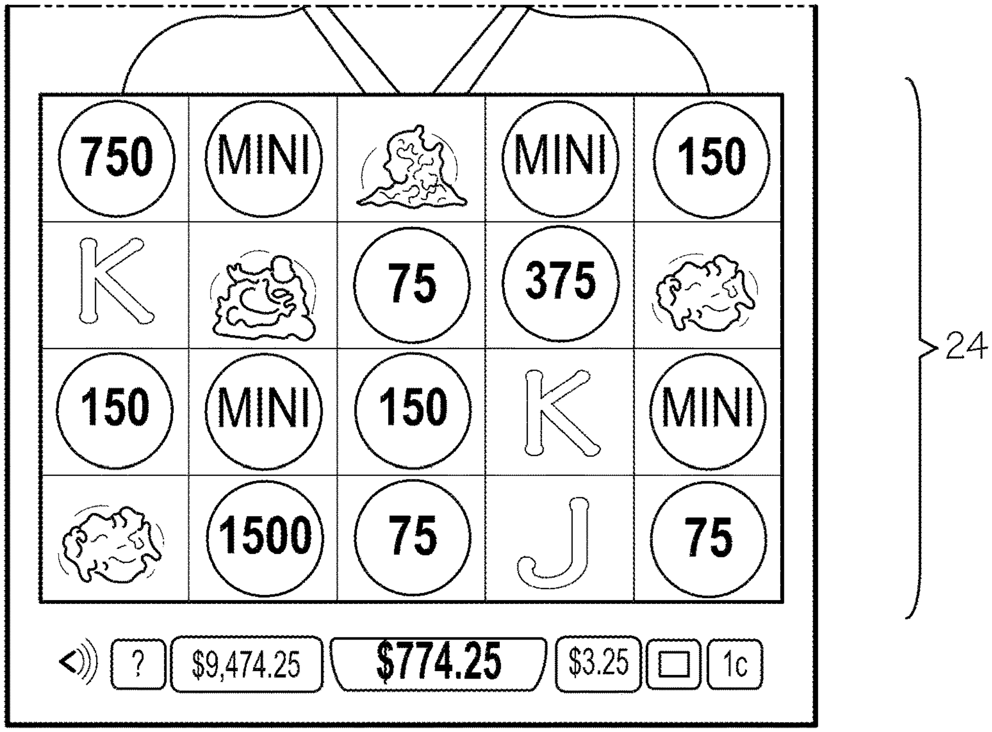

In reference to FIGS. 8A-8D, the illustrative game may conclude with a spouting fountain 140 of a plurality of representative symbols 142. The illustrated game displays the matrix 24 with each of the play positions 30 occupied with a respective one of the plurality of game symbols. The fountain 140 initiates for example low on the display, in the illustrated embodiment shown in FIG. 8A, from the player accumulator 50. The symbols 142 in the illustrated embodiment are depicted as gold coin. The symbols 142 that move individually in a fountain as shown in FIGS. 8B and 8C upwardly and spin and turn across the matrix 24 and fall downwardly during display on the display 20. The foundation 140 slows and stops. As shown in FIG. 8D, the illustrated game displays the matrix 24 with each of the play positions 30 occupied with a respective one of the plurality of game symbols. The game is then ready for selective continued play upon entry of a payment as discussed above.

The foregoing discloses illustrative embodiments of a random draw game having a re-arrangeable matrix of column and row play positions each having an open state and locked state, the open state for display of the random game symbol received during play of a game and the locked state for holding the game symbol having an award, for creating a win row or win column of award game symbols during sequential plays of the game, which game symbols in the win row after award are removed and award game symbols vertically higher in the matrix cascade to a lower play position having an open state for re-arranging the matrix for subsequent play of the game. A method of re-arranging a matrix game for play is disclosed. The forgoing written description enables one of ordinary skill in the art to practice the invention in disclosed embodiments as well as making and using alternative embodiments within the scope of the claims.

What is claimed is:

1. A sequential play game having a re-arrangeable play matrix, comprising:

a play matrix of a plurality of columns and rows of play positions for a game, whereby each column has a respective vertical stack of play positions and laterally adjacent play positions in each vertical stack define the respective row of play positions, said play positions displaying game symbols during a play of the game;

each play position having either an open state or a locked state, said open state for receiving one of a plurality of game symbols for display during the play of the game, each said game symbol being of a first type or of a second type, and said locked state holding the game symbol of the first type in association with a one of the plurality of play positions, whereby during the play of the game, the play positions having the open state display one of the plurality of the game symbols received during a predetermined period;

upon completion of the predetermined period, each play position having the open state and displaying the game symbol of the first type changes from the open state to the locked state;

a game controller configured, upon occurrence of a win event in which one or more of the rows is a win row by displaying one or more of the game symbol of the first type matching a predetermined win criteria or one or more of the columns is a win column by displaying one or more of the game symbol of the first type matching the predetermined win criteria, to:

award a prize value associated with each game symbol of the first type in said win row or win column;

change the respective state of each play position in said win row or said win column having from the locked state to the open state;

remove the display of each game symbol of the first type in said win row or said win column;

if a win row, cascade the game symbol of the first type in a play position vertically higher in the stack than the win row, if any, to a sequentially lowermost play position in the stack having the first open state, change the sequentially lowermost play position to the locked state, and change the play position from which the game symbol of the first type cascaded to the open state; and play the game and make the win determination, and if there is a win row or a win column, award a prize value associated with each game symbol of the first type in said win row or win column; and determine whether to play the game again.

2. The sequential play game having a re-arrangeable play matrix as recited in claim 1, further comprising a plurality of reels, each reel having a plurality of sequential positions and each position depicting one of the plurality of game symbols and each column associated with a respective one of the reels, whereby during the predetermined period, the reels being rotated during play of the game, pass the positions sequentially through the play matrix for display of the one of the plurality of game symbols in the respective stack of play positions having the open state.

3. The sequential play game having a re-arrangeable play matrix, as recited in claim 1, wherein the game symbol of the first type is one of a prize award, a points value, or a spin value, whereby the player is awarded the respective value of the prize award, the points value, or additional plays of the game based on the spin value, for each win event game symbol.

4. The sequential play game having a re-arrangeable play matrix, as recited in claim 3, wherein the win criteria for award of prizes is the win row or win column displaying three or more game symbols of the first type.

5. The sequential play game having a re-arrangeable play matrix, as recited in claim 3, wherein the points value awarded is multiplied by a wager value multiplier.

6. The sequential play game having a re-arrangeable play matrix, as recited in claim 5, wherein the wager value multiplier is a first value or a second value depending on a wager amount of the player to play the game relative to a predetermined amount, said first value less than the second value.

7. The sequential play game having a re-arrangeable play matrix, as recited in claim 1, wherein the game symbol of the second type is one of a plurality of play symbols.

8. The sequential play game having a re-arrangeable play matrix as recited in claim 1, wherein a play of the game having at least one win row and one win column, the win row awards are awarded before the win column awards are awarded.

9. The sequential play game having a re-arrangeable play matrix as recited in claim 1, further comprising the game, upon no further available plays, awarding the win awards displayed in the matrix.

10. The sequential play game having a re-arrangeable play matrix as recited in claim 1, further comprising an achievement announcement in recognition of wins by the player during play of the game.

11. The sequential play game having a re-arrangeable play matrix as recited in claim 1, further comprising prior to conclusion of the game a fountain of symbols spouting from a lower portion of a screen, said symbols moving upwardly in a spinning and turning display across the matrix shown on the screen.

12. A method of arranging a matrix in a sequential play game, comprising the steps of:

(a) displaying a play matrix of a plurality of columns and rows of play positions, whereby each column has respective vertical stack of play positions and laterally adjacent play positions in each vertical stack define the respective row of play positions, each play position having an open state or a locked state;

(b) providing a plurality of game symbols for random display in the play positions of the matrix, the game symbols of a first type for an award and of a second type, the game symbols displayed in the play positions having the open state;

(c) after stopping the providing of the game symbols, for each play position having the open state and displaying the game symbol of the first type, changing said play position from the open state to the locked state;

(d) upon occurrence of a win event of one of the rows displaying one or more of the game symbol of the first type as a win row matching a predetermined win criteria or of one of the columns displaying one or more of the game symbol of the first type as a win column matching the predetermined win criteria:

awarding a prize value associated with each game symbol of the first type in said win row or said win column;

changing the respective state of each play position in said win row or said win column having the locked state to the open state;

removing the display of each game symbol of the first type in said win row or said win column;

if a win row, cascading the game symbol of the first type in a play position in the respective column vertically higher than the win row, if any, to a sequentially lowermost play position having the open state, changing said sequentially lowermost play position to the locked state and the play position from which the game symbol of the first type cascaded to the open state; and playing the game and making-the win event determination, and if there is a win row or a win column, awarding a prize value associated with each game symbol of the first type in said win row or win column; and (e) determining whether to play the game again with the matrix.

13. The method of arranging a matrix in a sequential play game as recited in claim 12, wherein the step of providing the plurality of game symbols comprises simulating rotation of a plurality of rotatable reels, each reel having a plurality of sequential positions and each position depicting one of the game symbols, each column associated with a respective one of the reels, whereby the rotation of the plurality of rotatable reels passes the positions sequentially in the respective column of the play matrix and displaying the game symbol of the reel in a respective play position having the open state.

14. The method of arranging a matrix in a sequential play game as recited in claim 12, wherein the game symbol of the first type is one of a prize award, a points value, or a spin value, whereby the player is awarded the respective value of the prize award, the points value, or additional plays of the game based on the spin value, for each game symbol in the win row or win column upon determination of the win event.

15. The method of arranging a matrix in a sequential play game as recited in claim 12, wherein the win criteria for award of prizes is the win row or win column displaying three or more game symbols of the first type.

16. The method of arranging a matrix in a sequential play game as recited in claim 12, further comprising the step of multiplying the points value awarded by a wager value multiplier.

17. The method of arranging a matrix in a sequential play game as recited in claim 16 wherein the wager value multiplier is a first value or a second value depending on a wager amount of the player to play the game relative to a predetermined amount, said first value less than the second value.

18. The method of arranging a matrix in a sequential play game as recited in claim 12, wherein the game symbol of the second type is one of a plurality of play symbols.

19. The method of arranging a matrix in a sequential play game as recited in claim 12, wherein the win event from the play of the game comprises at least one win row and one win column, the win row awards are awarded before the win column awards are awarded.

20. The method of arranging a matrix in a sequential play game as recited in claim 12, the game, upon no further available plays, awarding the win awards displayed in the matrix.

21. The method of arranging a matrix in a sequential play game as recited in claim 12, further comprising displaying an achievement announcement in recognition of wins by the player during play of the game.

22. The method of arranging a matrix in a sequential play game as recited in claim 12, further comprising prior to conclusion of the game displaying a fountain of symbols spouting from a lower portion of a screen, said symbols moving upwardly in a spinning and turning display across the matrix shown on the screen.

* * * * *